United States Patent
Khadirsharbiyani et al.

(10) Patent No.: US 12,073,256 B2
(45) Date of Patent: Aug. 27, 2024

(54) SYSTEMS, METHODS, AND DEVICES FOR DATA PROPAGATION IN GRAPH PROCESSING

(71) Applicant: Samsung Electronics Co., Ltd., Suwon-si (KR)

(72) Inventors: Soheil Khadirsharbiyani, State College, PA (US); Nima Elyasi, San Jose, CA (US); Armin Haj Aboutalebi, San Jose, CA (US); Changho Choi, San Jose, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 568 days.

(21) Appl. No.: 17/170,881

(22) Filed: Feb. 8, 2021

(65) Prior Publication Data

US 2022/0107844 A1    Apr. 7, 2022

Related U.S. Application Data

(60) Provisional application No. 63/133,779, filed on Jan. 4, 2021, provisional application No. 63/130,532, filed
(Continued)

(51) Int. Cl.
*G06F 9/50* (2006.01)
*G06F 9/38* (2018.01)
*G06F 16/901* (2019.01)

(52) U.S. Cl.
CPC .......... *G06F 9/5061* (2013.01); *G06F 9/3885* (2013.01); *G06F 9/5016* (2013.01); *G06F 16/9024* (2019.01)

(58) Field of Classification Search
CPC .................................................. G06F 9/5061
See application file for complete search history.

(56) References Cited

U.S. PATENT DOCUMENTS 8,516,454 B2    8/2013    Mizrachi et al.
8,943,011 B2    1/2015    Gong et al.
(Continued)

FOREIGN PATENT DOCUMENTS

| CN | 102089752 A | 6/2011 |
| CN | 109993683 A | 7/2019 |
| CN | 111198977 A | 5/2020 |

OTHER PUBLICATIONS

Vora, Keval, "LUMOS: Dependency-Driven Disk-based Graph Processing", USENIX Association, 2019 USENIX Annual Technical Conference, Jul. 10-12, 2019, Renton, WA, USA, 15 pages.

*Primary Examiner* — Charlie Sun
(74) *Attorney, Agent, or Firm* — Renaissance IP Law Group LLP

(57) ABSTRACT

A method of partitioning a graph for processing may include sorting two or more vertices of the graph based on incoming edges and outgoing edges, placing a first one of the vertices with fewer incoming edges in a first partition, and placing a second one of the vertices with fewer outgoing edges in a second partition. The first one of the vertices may have a lowest number of incoming edges, and the first one of the vertices may be placed in a first available partition. The second one of the vertices may have a lowest number of outgoing edges, and the second one of the vertices may be placed in a second available partition. A method for updating vertices of a graph may include storing a first update in a first buffer, storing a second update in a second buffer, and transferring the first and second updates to a memory using different threads.

20 Claims, 27 Drawing Sheets

Related U.S. Application Data on Dec. 24, 2020, provisional application No. 63/086,590, filed on Oct. 1, 2020.

(56) References Cited

U.S. PATENT DOCUMENTS

| | | |
|---|---|---|
| 9,400,767 B2 | 7/2016 | Balmin et al. |
| 10,191,948 B2 | 1/2019 | Vemuri et al. |
| 10,706,103 B2 | 7/2020 | Agarwal et al. |
| 11,636,327 B2 | 4/2023 | Nurvitadhi et al. |
| 2020/0183604 A1 | 6/2020 | Elyasi et al. |
| 2021/0286790 A1* | 9/2021 | Lozi ............... G06F 16/212 |

* cited by examiner

| Vertex (v) | 1 | 2 | 3 | 4 |
|---|---|---|---|---|
| \|outedges(v)\| | 2 | 2 | 2 | 1 |

| Vertex | Value |
|---|---|
| 1 | 0.5 |
| 2 | 0.5 |
| 3 | 0.5 |
| 4 | 1 |

(a) Initial Value

| Vertex | Value |
|---|---|
| 1 | 0.8125 |
| 2 | 0.875 |
| 3 | 1 |
| 4 | 0.9375 |

(b) First Iteration

| Vertex | Value |
|---|---|
| 1 | 0.8594 |
| 2 | 0.9766 |
| 3 | 0.9844 |
| 4 | 1.0859 |

(c) Second Iteration

| Vertex | Partition Number |
|---|---|
| 1 | 1-2* |
| 2 | 1-2* |
| 3 | 4 |
| 4 | 3 |
| 5 | 5 |

| Group 1 | Group 2 | Group 3 |
|---|---|---|
| 1 → 3 | 3 → 4 | |
| 2 → 3 | | |
| 4 → 5 | | |

| Vertex | Partition Number |
|---|---|
| 1 | 1-2* |
| 2 | 1-2* |
| 3 | 5 |
| 4 | 3-4* |
| 5 | 3-4* |

| Group 1 | Group 2 | Group 3 |
|---|---|---|
| 1 → 3 | 3 → 4 | 4 → 5 |
| 2 → 3 | | |

| Vertex | Partition Number |
|---|---|
| 1 | 1-4* |
| 2 | 1-4* |
| 3 | 1-4* |
| 4 | 1-4* |
| 5 | 5 |

| Group 1 | Group 2 | Group 3 |
|---|---|---|
| | 4→5 | 1→3 |
| | | 2→3 |
| | | 3→4 |

| Vertex | Partition Number |
|---|---|
| 1 | 1-5* |
| 2 | 1-5* |
| 3 | 1-5* |
| 4 | 1-5* |
| 5 | 1-5* |

| Group 1 | Group 2 | Group 3 |
|---|---|---|
| | | 1→3 |
| | | 2→3 |
| | | 3→4 |
| | | 4→5 |

| Vertex | Partition Number |
|---|---|
| 1 | 1 or 2 |
| 2 | 2 or 1 |
| 3 | 3 |
| 4 | 4 |
| 5 | 5 |

SYSTEMS, METHODS, AND DEVICES FOR DATA PROPAGATION IN GRAPH PROCESSING

CROSS-REFERENCE TO RELATED APPLICATIONS

This application claims priority to, and the benefit of, U.S. Provisional Patent Application Ser. No. 63/086,590 titled "Systems, Methods, and Devices For Data Propagation In Near-Storage Graph Processing" filed Oct. 1, 2020 which is incorporated by reference, U.S. Provisional Patent Application Ser. No. 63/130,532 titled "Systems, Methods, and Devices for Data Propagation in Near-Storage Graph Processing" titled Dec. 24, 2020 which is incorporated by reference, and U.S. Provisional Patent Application Ser. No. 63/133,779 titled "Systems, Methods, and Devices for Data Propagation in Graph Processing" filed Jan. 4, 2021 which is incorporated by reference.

TECHNICAL FIELD

This disclosure relates generally to graph processing, and more specifically to systems, methods, and devices for data propagation in graph processing.

BACKGROUND

Graph processing systems may attempt to propagate values calculated during an iteration of an algorithm to a later iteration, for example, to reduce input and/or output (I/O) accesses of storage devices.

The above information disclosed in this Background section is only for enhancement of understanding of the background of the invention and therefore it may contain information that does not constitute prior art.

SUMMARY

A method of partitioning a graph for processing may include sorting two or more vertices of the graph based on incoming edges and outgoing edges, placing a first one of the vertices with fewer incoming edges in a first partition, and placing a second one of the vertices with fewer outgoing edges in a second partition. The first one of the vertices may have a lowest number of incoming edges, and the first one of the vertices may be placed in a first available partition. The second one of the vertices may have a lowest number of outgoing edges, and the second one of the vertices may be placed in a second available partition. The method may further include deleting one or more edges associated with the first and second ones of the vertices from the graph, placing one of the vertices with fewer remaining incoming edges in the first partition, and placing one of the vertices with fewer remaining outgoing edges in the second partition. The first one of the vertices may have more outgoing edges than incoming edges. The second one of the vertices may have more incoming edges than outgoing edges. The method may further include determining a number of the partitions based on a size of a memory for processing the partitions and a number of edges in the graph.

An apparatus may include a first compute unit configured to receive, from a memory, first vertex data and first edge data associated with the first vertex data and generate a first update based on the first vertex data and first edge data, a second compute unit configured to receive, from the memory, second vertex data and second edge data associated with the second vertex data and generate a second update based on the second vertex data and second edge data, and a writer configured to write the first update to the memory. The writer may be a first writer, and the apparatus may further include a second writer configured to write one of the first or second updates to the memory. The apparatus may further include a distributor configured to buffer the first and second updates and distribute the first and second updates to the first and second writers, respectively. The first compute unit may be configured to send the first update to the first writer or the second writer based on a memory location for the first update. The memory may include a first bank configured to store the first edge data, and a second bank configured to store the second edge data. The apparatus may further include a storage medium, and the memory, wherein the memory is configured to receive the first and second vertex data and the first and second edge data from the storage medium. The writer may be configured to write at least a portion of the first update to the storage medium based on a utilization of the memory. The first compute unit may be configured to generate the first update for a first iteration of a graph processing algorithm, and the writer may be configured to propagate at least a portion of the first update to a second iteration of the graph processing algorithm. The first compute unit and the writer may be configured as a pipeline for the first edge data and the first update. The writer may be a first writer, and the apparatus may further include a third compute unit configured to receive, from the memory, the first vertex data and the first edge data and generate a third update based on the first vertex data and first edge data, a fourth compute unit configured to receive, from the memory, the second vertex data and the second edge data and generate a fourth update based on the second vertex data and second edge data, and a second writer configured to write the third update to the memory, wherein the first compute unit, the second compute unit, and the first writer may be configured to run a first application on the first vertex data, first edge data, second vertex data, and second edge data, and the third compute unit, the fourth compute unit, and the second writer may be configured to run a second application on the first vertex data, first edge data, second vertex data, and second edge data concurrently with the first application.

A method for updating vertices of a graph may include storing a first update for a first vertex in a first buffer, storing a second update for a second vertex in a second buffer, transferring the first update from the first buffer to a memory using a first thread, and transferring the second update from the second buffer to the memory using a second thread. The first buffer may be processed by a single thread. The first and second buffers may be configured to store the first and second vertices based on ranges of the vertices.

BRIEF DESCRIPTION OF THE DRAWINGS

The figures are not necessarily drawn to scale and elements of similar structures or functions may generally be represented by like reference numerals or portions thereof for illustrative purposes throughout the figures. The figures are only intended to facilitate the description of the various embodiments described herein. The figures do not describe every aspect of the teachings disclosed herein and do not limit the scope of the claims. To prevent the drawing from becoming obscured, not all of the components, connections, and the like may be shown, and not all of the components may have reference numbers. However, patterns of component configurations may be readily apparent from the drawings. The accompanying drawings, together with the specification, illustrate example embodiments of the present disclosure, and, together with the description, serve to explain the principles of the present disclosure.

DETAILED DESCRIPTION

Overview

Figures 1, 2, 3:
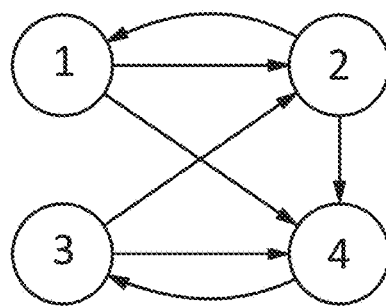
FIG. 1 illustrates an example embodiment of a graph in accordance with example embodiments of the disclosure.
FIG. 2 illustrates a table that tabulates the number of outgoing edges for each vertex illustrated in FIG. 1 in accordance with example embodiments of the disclosure.
FIG. 3 illustrates example results that may be obtained for the vertices illustrated in FIG. 1 over two iterations in accordance with example embodiments of the disclosure.

Graph processing systems may analyze relationships between elements in applications such as social networks, search engines, recommendation systems, and/or the like. Graphs are data structures that may include vertices (which may represent elements) and edges (which may represent relationships between the elements). In some embodiments, graph processing systems may only be able to process vertices and/or edges that are located in memory, which may be a limited resource. To process graphs on a large scale, the vertices and/or edges may be stored in storage devices and then moved to memory to be processed in batches that may be referred to as partitions. A potential problem in large-scale graph processing may be the amount of time spent moving data between storage and memory. In some embodiments, a graph processing system may spend a large percentage of its processing time moving data from storage to memory. Thus, the effectiveness of a partitioning scheme may affect the throughput, latency, power consumption, and/or the like, of a graph processing system.

Some of the principles of this disclosure relate to techniques that may partition vertices for graph processing based on the topology of the graph. For example, in some embodiments, a partitioning method may sort vertices based on the number of incoming and/or outgoing edges. Vertices with fewer incoming edges may be placed in earlier partitions, and vertices with fewer outgoing edges may be placed in later partitions. Some embodiments may sort and/or place vertices in an iterative manner which may delete edges associated with vertices that have already been placed in partitions, thereby enabling the method to operate on the remaining topology of the graph. Depending on the implementation details, these techniques may increase propagation of vertex data, thereby reducing input and/or output (I/O) accesses of edge data.

Some additional principles of this disclosure relate to techniques that may update vertex data in a manner that may reduce synchronization overhead in graph processing operations. For example, in some embodiments, vertex updates may be stored in multiple buffers, e.g., based on vertex ranges, and assigned to different execution threads. Depending on the implementation details, this may reduce or eliminate atomic memory operations, thereby reducing synchronization overhead.

Some additional principles of this disclosure relate to techniques that may arrange and/or use resources to improve parallelism, I/O sequentiality, resource utilization and/or the like. For example, in some embodiments, compute units may be assigned to banks of memory and configured to receive streams of edge data from the memory banks. Depending on the implementation details, this may improve memory port and/or resource utilization. The compute units may be further configured to generate multiple streams of updates based on a number of writers (e.g., write modules) that may be configured to write the updates to memory. In some embodiments, a distributor may buffer the streams of updates and direct them to specific writers such that each writer may update specific ranges of vertices. Depending on the implementation details, this may increase sequential accesses to memory and/or reduce atomic update overhead. Moreover, the data streams may be applied to compute units and/or writers in a pipeline technique which may further increase throughput.

The principles disclosed herein have independent utility and may be embodied individually, and not every embodiment may utilize every principle. However, the principles may also be embodied in various combinations, some of which may amplify the benefits of the individual principles in a synergistic manner.

Although the principles disclosed herein are not limited to any particular applications, in some embodiments, the techniques may be especially beneficial when applied to near-storage graph processing. For example, a computational storage device such as a solid state drive (SSD) may use one or more accelerator devices to provide a high level of parallelism and/or efficiency which may improve the performance of a graph processing algorithm. Examples of accelerator devices may include field programmable gate arrays (FPGAs), complex programmable logic devices (CPLDs), application specific integrated circuits (ASICs), central processing units (CPUs) such as complex instruction set computer (CISC) processors and/or reduced instruction set computer (RISC) processors, and/or the like executing instructions, and/or the like, as well as graphics processing units (GPUs), neural processing units (NPUs), and/or the like.

However, in some embodiments, a computational storage device may have a limited amount of memory. Thus, the graph vertices and/or edges may be partitioned into a larger number of smaller partitions to fit into the available memory. The partitioning and/or resource allocation techniques disclosed herein may enable a graph processing algorithm to scale with an increasing number of partitions, thereby enabling some embodiments to improve parallelism, increase I/O sequentiality, reduce I/O accesses, reduce synchronization overhead, and/or the like, while running on a computational storage device with limited memory.

Graph Processing

FIG. 1 illustrates an example embodiment of a graph having four vertices 1, 2, 3, and 4 connected by various edges illustrated as arrows in accordance with example embodiments of the disclosure. Arrows pointing out of a vertex may be referred to as out-edges or outgoing edges, and arrows pointing into a vertex may be referred to as in-edges or incoming edges. The table illustrated in FIG. 2 tabulates the number of outgoing edges for each vertex illustrated in FIG. 1 in accordance with example embodiments of the disclosure.

To increase parallelization, in some embodiments, a graph may be processed iteratively by first providing each vertex with an initial value. Then, during each iteration, an algorithm may be used to update the value of each vertex based on the previous values of vertices connected through incoming edges. Thus, the value of each vertex may be updated during each iteration. After a number of iterations, the values of the vertices may converge to a final result.

An example of an algorithm that may be applied to the graph illustrated in FIG. 1 is given by Equation (1), where $R(v^t)$ may refer to the value calculated for vertex at iteration t, $R(u^{t-1})$ may refer to the value calculated for vertex u at iteration t−1, in-edges(v) may refer to the number of incoming edges to vertex v, |out-edges(u)| may refer to the number of outgoing edges from vertex u, and d may refer to a damping factor (e.g., a constant) which may ensure that the values of the vertices may converge to finite values.

$$R(v^t) = 1 - d + d \times \sum_{in-edges(v)} \frac{R(u^{t-1})}{|out\text{-}edges(u)|} \quad (1)$$

In some embodiments, Equation (1) may be used to calculate rankings for the vertices. For example, in an implementation where each vertex represents a web page, and the edges represent links between pages, the final value of R for each vertex may be interpreted as a ranking of the importance of the page. Thus, R may provide a probability distribution that may represent the likelihood that a person randomly following links from page to page may end up on a particular page.

FIG. 3 illustrates example results that may be obtained for the vertices illustrated in FIG. 1 over two iterations using Equation (1) and the initial values shown in table (a) in accordance with example embodiments of the disclosure. Table (b) illustrates the values of the vertices after one iteration, and table (c) illustrates the values of the vertices after two iterations. The results of each iteration may be calculated based on the values from the previous iteration.

Depending on the implementation details, all of the vertex and/or edge data for a graph may not be able to fit in the memory available in the graph processing system. Thus, some embodiments may implement a synchronous out-of-core graph processing technique in which vertices may be divided into multiple partitions, and the edges may be divided into two-dimensional grids of blocks based on these partitions. Each block may then be loaded into memory and processed in sequence (e.g., one-by-one). The results may then be written back to storage in sequence.

Figure 4:
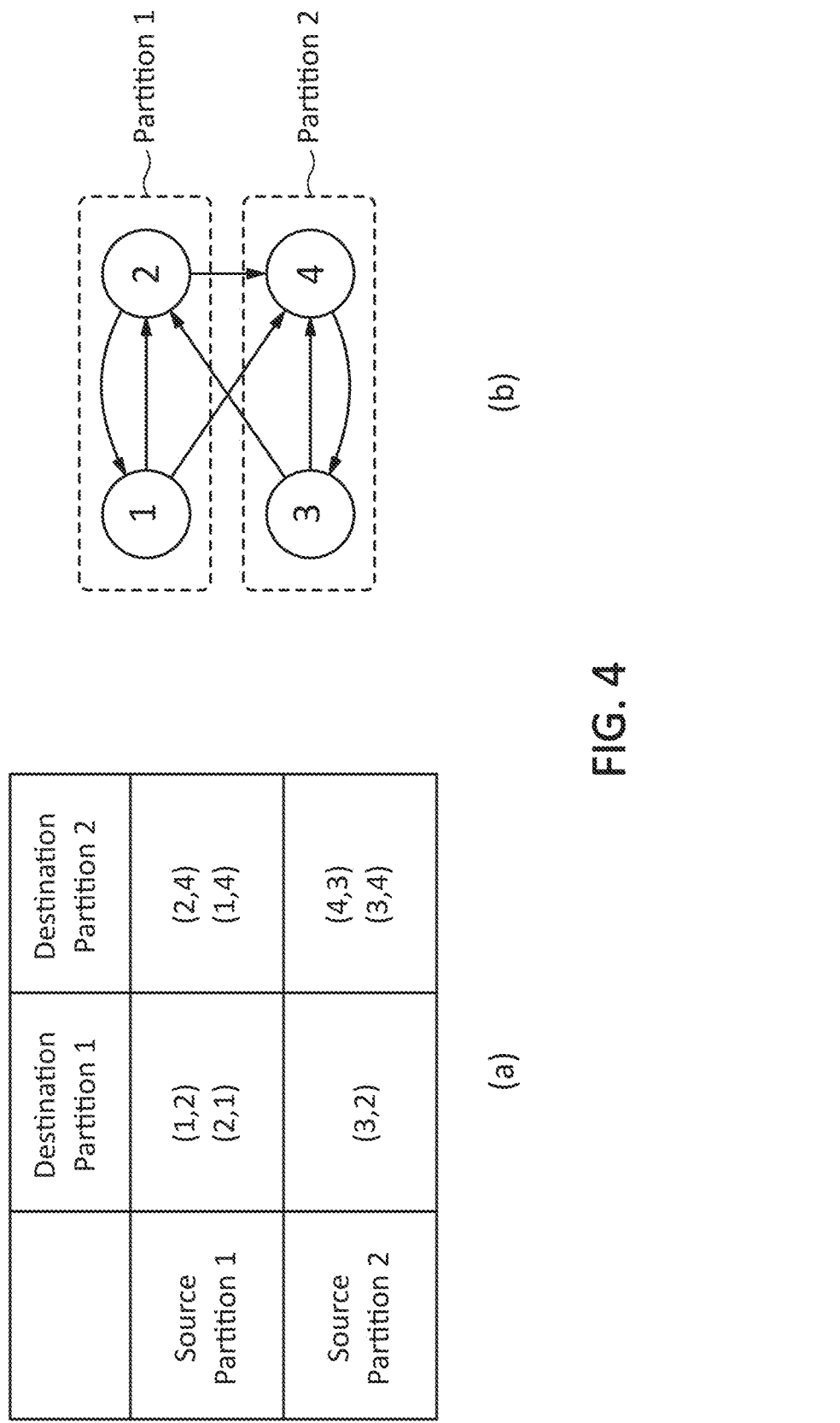
FIG. 4 illustrates an example embodiment of a data partitioning arrangement for a synchronous out-of-core graph processing technique in accordance with example embodiments of the disclosure.

FIG. 4 illustrates an example embodiment of a data partitioning arrangement for a synchronous out-of-core graph processing technique that may be used with the graph illustrated in FIG. 1 in accordance with example embodiments of the disclosure. As illustrated in part (a) of FIG. 4, vertices 1 and 2 may be placed in Partition 1, and vertices 3 and 4 may be placed in Partition 2. As illustrated in part (b) of FIG. 4, based on dividing the vertices into P partitions (in this example, P=2), and the edges may be partitioned into a P×P grid of blocks. Edges may be indicated as (x,y), x→y, and/or the like, where the edge may be outgoing from vertex x and incoming to vertex y. In the example illustrated in FIG. 4, the edges may be arranged with source partitions arranged vertically, and destination partitions arranged horizontally. Thus, the lower left block may include all edges that run from vertices in partition 2 to vertices in partition 1 (in this example, only the edge (3,2)).

In some embodiments, the blocks may be processed in column-oriented order with destinations being updated one-by-one. For example, in the embodiment illustrated in FIG. 4, the edges from Source Partition 1 to Destination Partition 1 (the top left block) may be processed first, followed by the edges from Source Partition 2 to Destination Partition 1 (the bottom left block), then the edges from Source Partition 1 to Destination Partition 2 (the top right block), and finally the edges from Source Partition 2 to Destination Partition 2 (the bottom right block).

Although synchronous out-of-core processing may enable a large graph to be processed in a system having a relatively small amount of memory, the frequent I/O operations involved in loading data into memory and writing results to storage may slow down computations, increase energy consumption, and/or the like.

Data Propagation

Some embodiments of graph processing systems may propagate future values of vertices for use by later iterations. For example, in some embodiments, for some edge blocks, vertex values computed for a current iteration may be used for a subsequent iteration. Thus, multiple results may be determined using a single calculation, Depending on the implementation details, this may reduce the time and/or energy associated with I/O operations by reducing the amount of edge and/or vertex data that may be loaded from storage while still providing synchronous processing semantics.

In some embodiments, values for specific vertices may be propagated on alternate iterations. For example, during even iterations, the future values of certain vertices may be calculated based on the current values of data. Then, during odd iterations, rather than reading all of the edges for each partition, the system may only read the edges for vertices that were not calculated in advance by the previous iteration.

Moreover, some embodiments of graph processing systems that implement data propagation may use various techniques to partition the graph data to fit into available memory. Either or both of these techniques may reduce the number of I/O requests during some iterations.

Figure 5:
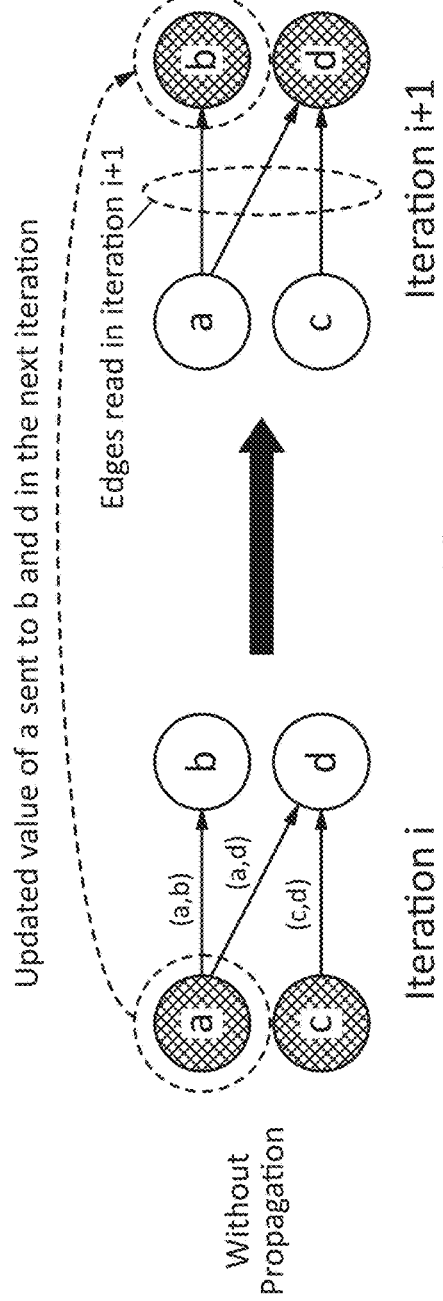
FIG. 5 illustrates an example embodiment of a graph processing technique without data propagation in accordance with example embodiments of the disclosure.

FIG. 5 illustrates an example embodiment of a graph processing technique without data propagation in accordance with example embodiments of the disclosure.

Figure 6:
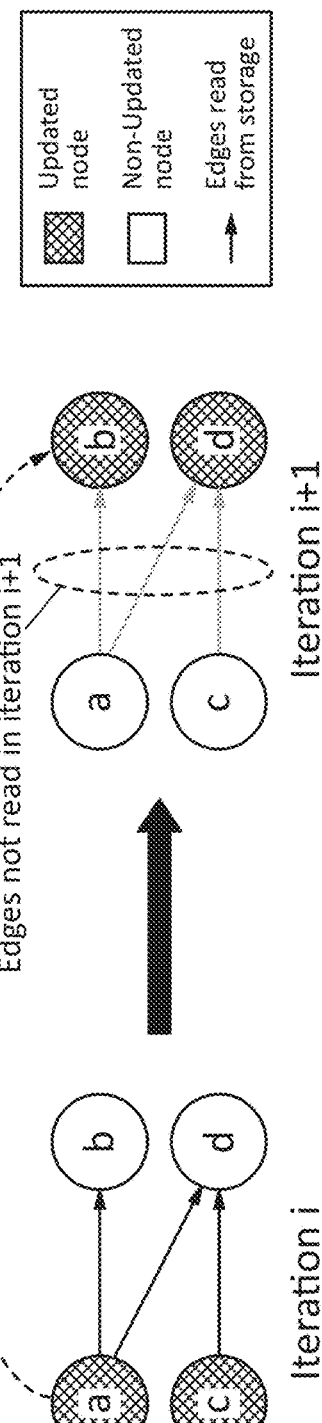
FIG. 6 illustrates an example embodiment of a graph processing technique with data propagation in accordance with example embodiments of the disclosure.

FIG. 6 illustrates an example embodiment of a graph processing technique with data propagation in accordance with example embodiments of the disclosure.

In the embodiments illustrated in FIGS. 5 and 6, the vertices a, b, c, and d may be divided into P partitions, and the edges (a,b), (a,d), and (c,d) may be divided into P×P blocks in a manner similar to the embodiment illustrated in FIG. 4. Moreover, partitions may be processed in numerical order based on partition number. Thus, for an edge (x,y), if the partition number of vertex x is less than or equal to the partition number of vertex y, the edge may be used to calculate the future value of vertex y during the current iteration. Thus, in the embodiment illustrated in FIG. 6, which may implement data propagation, for an edge (x,y), if the partition number of vertex x is less than or equal to the partition number of vertex y, the edge may be used to calculate the future value of vertex y during the current iteration.

Referring to FIG. 5, during iteration i, the values of vertices a and c may be updated based on previous values of data. Also during iteration i, the values of vertices b and d may be updated based on the previous values of vertices a and c and reading the edges (a,b), (a,d), and (c,d) from storage. The updated values of vertices a and c are not used to update the values of b and d during iteration i. Then, during iteration i+1, the values of vertices b and d may be updated by reading the edges (a,b), (a,d), and (c,d) from storage and by using the values of vertices a and c calculated during iteration i. Thus, the edges may be read a second time during iteration i+1.

Referring to FIG. 6, during iteration i, the values of vertices a and c may be updated based on previous values of data. Also during iteration i, the values of vertices b and d may be updated based on the previous values of vertices a and c and reading the edges (a,b), (a,d), and (c,d) from storage. However, because the values of vertices a and c are known during iteration i, and the edges (a,b), (a,d), and (c,d) have been read during iteration i, the currently updated values of vertices a and c may be used to calculate the future values of vertices b and d. Thus, the values of vertices b and d calculated during iteration i may be applied during iteration i+1 without reading the edges (a,b), (a,d), and (c,d) from storage during iteration i+1. Thus, by propagating the future values of vertices b and d, some embodiments may reduce the number of I/O requests involved in loading vertex and/or edge data into memory from storage.

Partitioning

Figure 7:
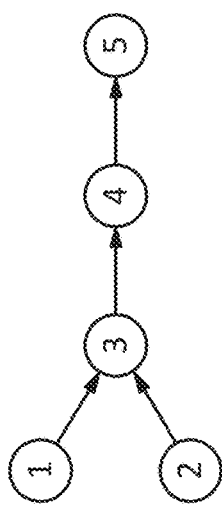
FIG. 7 illustrates an example graph that may be used to illustrate the operation of various partitioning techniques in accordance with example embodiments of the disclosure.

FIG. 7 illustrates an example embodiment of a graph that may be used to illustrate the operation of various partitioning techniques in accordance with example embodiments of the disclosure. The embodiment illustrated in FIG. 7 may include first and second vertices (1 and 2), each having a directed edge to a third vertex (3). The third vertex (3) may have a directed edge to a fourth vertex (4), which may have a directed edge to a fifth vertex (5).

Figure 8:
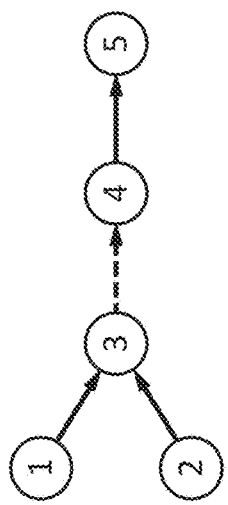
FIG. 8 illustrates an embodiment of a first partitioning technique in which vertices with a lower ratio of in-edges/out-edges may be assigned to lower number partitions in accordance with example embodiments of the disclosure.

FIG. 8 illustrates an embodiment of a first partitioning technique (T1) in which vertices with a lower ratio of in-edges/out-edges may be assigned to lower number partitions in accordance with example embodiments of the disclosure. With this technique, future values may be calculated across edges 1→2, 2→3, and 4→5. Future values may not be calculated across edge 3→4. Thus, the embodiment illustrated in FIG. 8 may have a cross-propagation of 75 percent.

Figure 9:
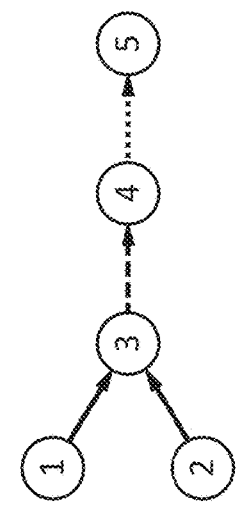
FIG. 9 illustrates an embodiment of a second partitioning technique in which vertices with a lower number of in-edges may be assigned to lower number partitions in accordance with example embodiments of the disclosure.

FIG. 9 illustrates an embodiment of a second partitioning technique (T2) in which vertices with a lower number of in-edges may be assigned to lower number partitions in accordance with example embodiments of the disclosure. With this technique, future values may be calculated across edges 1→2 and Future values may not be calculated across edge 3→4. Future values may be calculated across edge 4→5 depending on the relative partition numbers of the vertices. Thus, the embodiment illustrated in FIG. 9 may have a cross-propagation between 50 percent and 75 percent.

Figure 10:
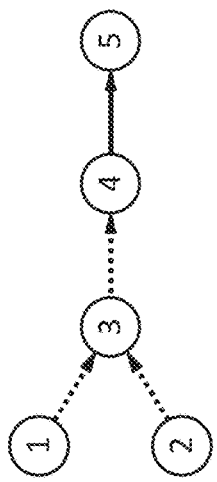
FIG. 10 illustrates an embodiment of a third partitioning technique in which vertices with a lower number of out-edges may be assigned to lower number partitions in accordance with example embodiments of the disclosure.

FIG. 10 illustrates an embodiment of a third partitioning technique (T3) in which vertices with a lower number of out-edges may be assigned to lower number partitions in accordance with example embodiments of the disclosure. With this technique, there may be no edges across which future values may be calculated with certainty. Future values may not be calculated across edge 4→5. Future values may be calculated across edges 1→3, 2→3, and 3→4 depending on the relative partition numbers of the vertices. Thus, the embodiment illustrated in FIG. 10 may have a cross-propagation between 0 percent and 75 percent.

Figure 11:
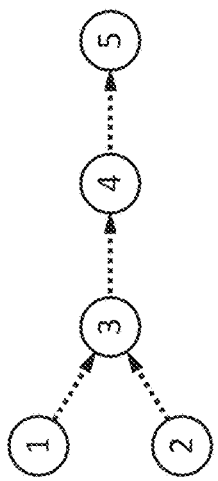
FIG. 11 illustrates an embodiment of a fourth partitioning technique in which vertices may be assigned to random partitions in accordance with example embodiments of the disclosure.

FIG. 11 illustrates an embodiment of a fourth partitioning technique (T4) in which vertices may be assigned to random partition in accordance with example embodiments of the disclosures. With this technique, the ability to calculate future values across each edge may depend entirely on the relative partition numbers of the vertices. Thus, the embodiment illustrated in FIG. 10 may have a cross-propagation between 0 percent and 100 percent.

In the graph on the left side of each of FIGS. 8-11, solid lines may indicate a group of edges (Group 1) across which future values may be calculated, dashed lines may indicate a group of edges (Group 2) across which future values may not be calculated, and dotted lines may indicate a group of edges (Group 3) across which future values may only be calculated under certain conditions (e.g., depending on relative partition numbers of the vertices). The table in the center of each of FIGS. 8-11 may indicate which edges belong to each group. The table at the right of each of FIGS. 8-11 may indicate which vertices are assigned to which partition numbers. A partition indicated as i-j* may indicate that the vertex may be assigned to any partition number between i and j.

In some embodiments, the data propagation and/or partitioning techniques described may limit the throughput, efficiency, and/or the like, of a graph processing system. For example, to process large datasets in systems with relatively small amounts of memory, the data may be divided into a larger number of partitions to fit into the available memory. However, in some embodiments, the techniques described above may not scale well with increasing numbers of partitions. For example, the partitioning techniques may fail to take advantage of available cross-propagation within partitions and/or may result in increased dependency between partitions. As another example, random partitioning may result in poor and/or unpredictable performance. (Even techniques T1, T2, and/or T3 may use random partitioning to resolve ties.) Moreover, even the partitioning techniques described above may still provide results that may require relatively large amounts of memory to process. Further, in some embodiments, the techniques described above may also fail to utilize CPU cycles which may be wasted due to synchronization overhead for atomic memory operations as described in more detail below.

Iterative Topology-Based Partitioning

Figure 12:
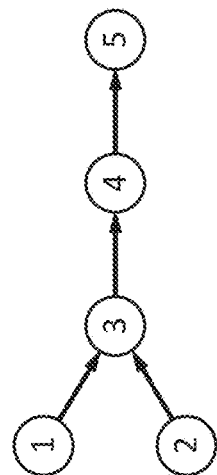
FIG. 12 illustrates an example embodiment of a graph partitioning technique that may take the topology of a graph into consideration in accordance with example embodiments of the disclosure.

FIG. 12 illustrates an example embodiment of a graph partitioning technique that may take the topology of a graph into consideration in accordance with example embodiments of the disclosure. Vertices 1-5 in the graph on the left of FIG. 12 may be divided into Partitions 1-5 as shown in the table illustrated on the right of FIG. 12.

The embodiment illustrated in FIG. 12 may take the topology of the graph into consideration to place vertices into partitions. For example, vertices with no in-coming edges may be placed in earlier partitions because their values may be more likely to be propagated to other vertices and/or partitions. (Lower numbered partitions and higher numbered partitions may be referred to as earlier partitions and later partitions, respectively, because they may be processed earlier and later, respectively, when partitions are processed in numerical order.) Moreover, placing vertices with no in-coming edges in earlier partitions may reduce or eliminate repetitive updates because they may lack in-coming edges to push further updates to them during execution, thereby reducing or eliminating repetitive reads and/or writes to and/or from storage.

As another example, vertices with no out-going edges may be placed on later partitions because they may not propagate values to other vertices due to a lack of out-going edges, Vertices at intermediate locations in the graph may be placed in consecutively numbered partitions based on their locations in the graph. Thus, in some embodiments, a partitioning technique may place data associated with vertices having fewer in-coming edges toward earlier partitions, and vertices with fewer out-going edges toward later partitions.

In the example illustrated in FIG. 12, the partitioning technique may achieve 100 percent cross-propagation. Taking the topology of the graph into consideration may enable a partitioning technique in accordance with example embodiments of the disclosure to increase the propagation of vertex and/or edge data within and/or across partitions, which in turn, may reduce I/O accesses because, for example, access of edge data for some parts of the graph may be skipped during alternate iterations. Moreover, a partitioning technique in accordance with example embodiments of the disclosure may increase cross-propagation for implementations with large numbers of partitions and/or reduce or eliminate randomness in the partitioning process.

Some potential benefits of partitioning techniques in accordance with example embodiments of the disclosure may be illustrated by comparing the embodiments illustrated in FIGS. 8 and 12. In the embodiment illustrated in FIG. 8, node 3 may have a higher ratio of in-edges to out-edges $$\left(e.g., \frac{\text{in-edges}}{\text{out-edges}}\right)$$

compared to node 4, which may cause the partitioning technique illustrated in FIG. 8 to place vertex 3 after vertex 4, However, placing the vertices in this manner may result in a cross-propagation of 80 percent because the future value across 3→4 may not be calculated, which may result in a higher number of I/O requests. In contrast, the embodiment illustrated in FIG. 12 may identify better vertices and place them into the next available partitions, which, depending on the implementation details, may result in high cross-propagation. For example, the embodiment illustrated in FIG. 12 may provide 100 percent cross-propagation, which may result in better execution time.

Figure 13:
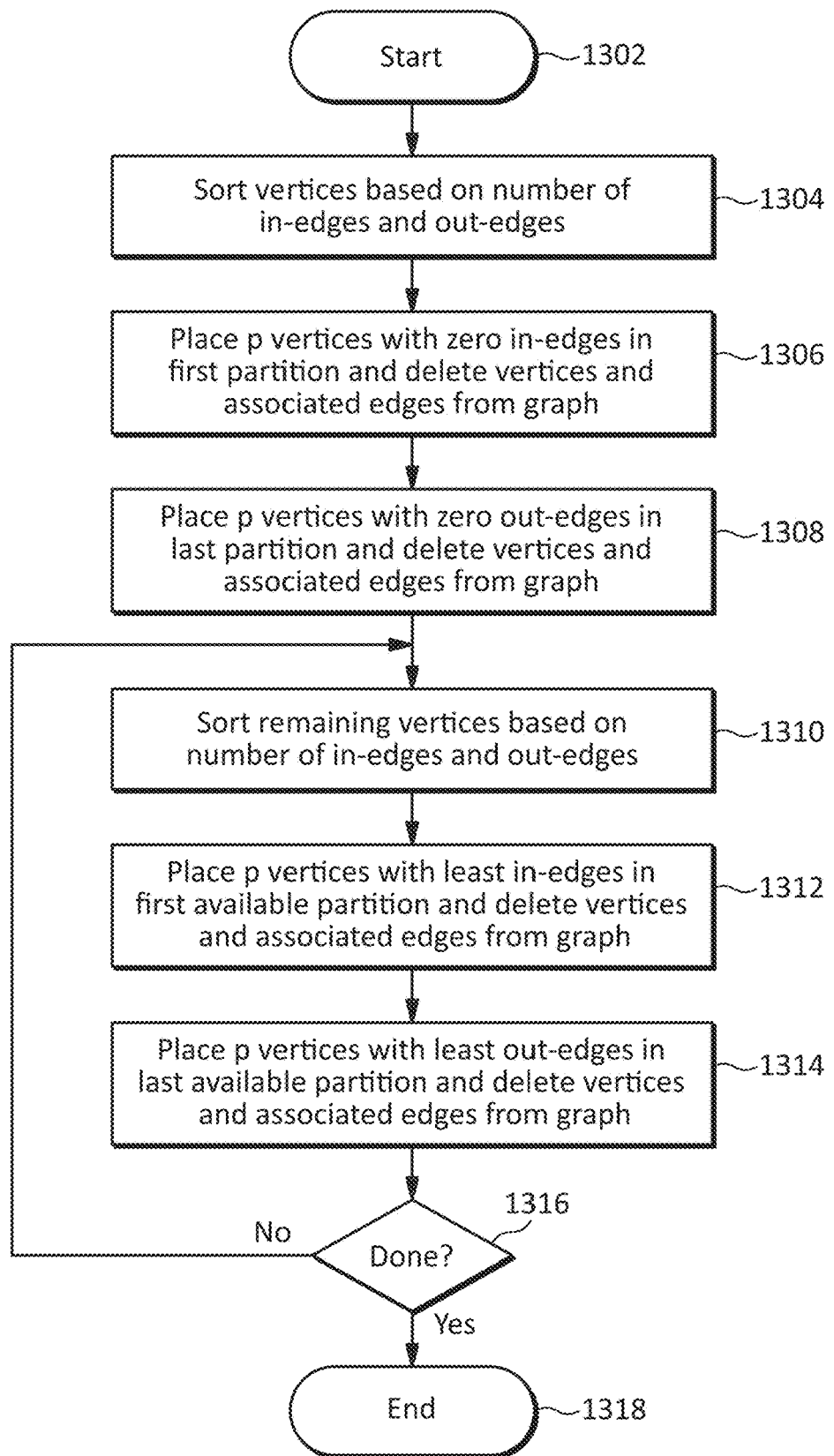
FIG. 13 illustrates an embodiment of an iterative graph partitioning technique in accordance with example embodiments of the disclosure.

FIG. 13 illustrates an embodiment of an iterative graph partitioning technique in accordance with example embodiments of the disclosure. The embodiment illustrated in FIG. 13 may take the topology of a graph into consideration by implementing an iterative technique. The method may begin at operation 1302. At operation 1304, the vertices of the graph may be sorted based on their number of in-edges and/or out-edges. At operation 1306, vertices with no in-edges (e.g., a number "p" of vertices with no in-edges, if any) may be placed in one or more first partitions and deleted from the graph along with their associated edges. At operation 1308, vertices with no out-edges (e.g., a number "p" of vertices with no out-edges, if any) may be placed in one or more last partitions and deleted from the graph along with their associated edges. At operation 1310, the remaining vertices may be sorted based on their number of in-edges and/or out-edges. At operation 1312, vertices with the lowest number of in-edges (e.g., a number "p" of vertices with the lowest number of in-edges, if any) may be placed in one or more earliest available partition and deleted from the graph along with their associated edges. At operation 1314, vertices with the lowest number of out-edges (e.g., a number "p" of vertices with the lowest number of out-edges, if any) may be placed in one or more latest available partition and deleted from the graph along with their associated edges. At operation 1316, the method may determine whether the graph has any remaining vertices. If there are any remaining vertices, the method may return to operation 1310 to perform another iteration. Otherwise, the method may end at operation 1318.

In some embodiments, a first partition may refer to the earliest, or one of the earliest, available partitions to be processed, while a last partition may refer to the latest, or one of the latest, available partitions to be processed. In some embodiments, operations 1304, 1306, and 1308 may be implemented as a first iteration of operations 1310, 1312, and 1314.

In some embodiments, to increase the convergence speed of the partitioning algorithm, instead of adding only vertices with zero incoming edges or outgoing edges, later iterations may place the p vertices with the lowest number of incoming edges and p vertices with the lowest number of outgoing edges.

The operations and/or components described with respect to the embodiment illustrated in FIG. 13, as well as all of the other embodiments described herein, are example operations and/or components. In some embodiments, some operations and/or components may be omitted and/or other operations and/or components may be included. Moreover, in some embodiments, the temporal and/or spatial order of the operations and/or components may be varied.

Figure 14:
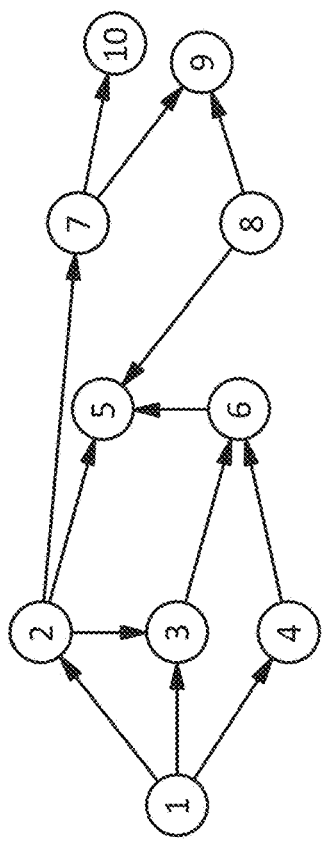
FIG. 14 illustrates an example embodiment of an iterative graph partitioning technique in accordance with example embodiments of the disclosure.
Figure 14:
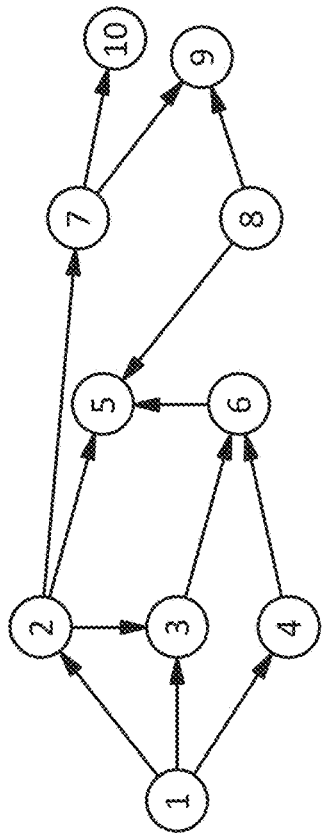
Figure 14:
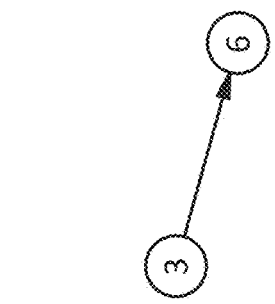
Figure 14:
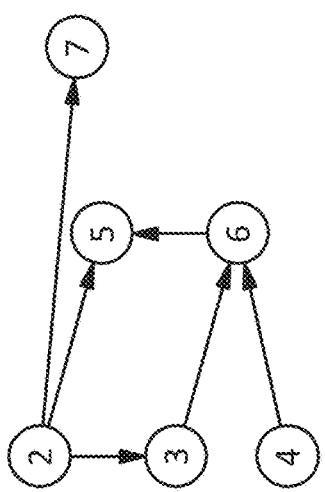

FIG. 14 illustrates an example embodiment of an iterative graph partitioning technique in accordance with example embodiments of the disclosure.

Figure 15:
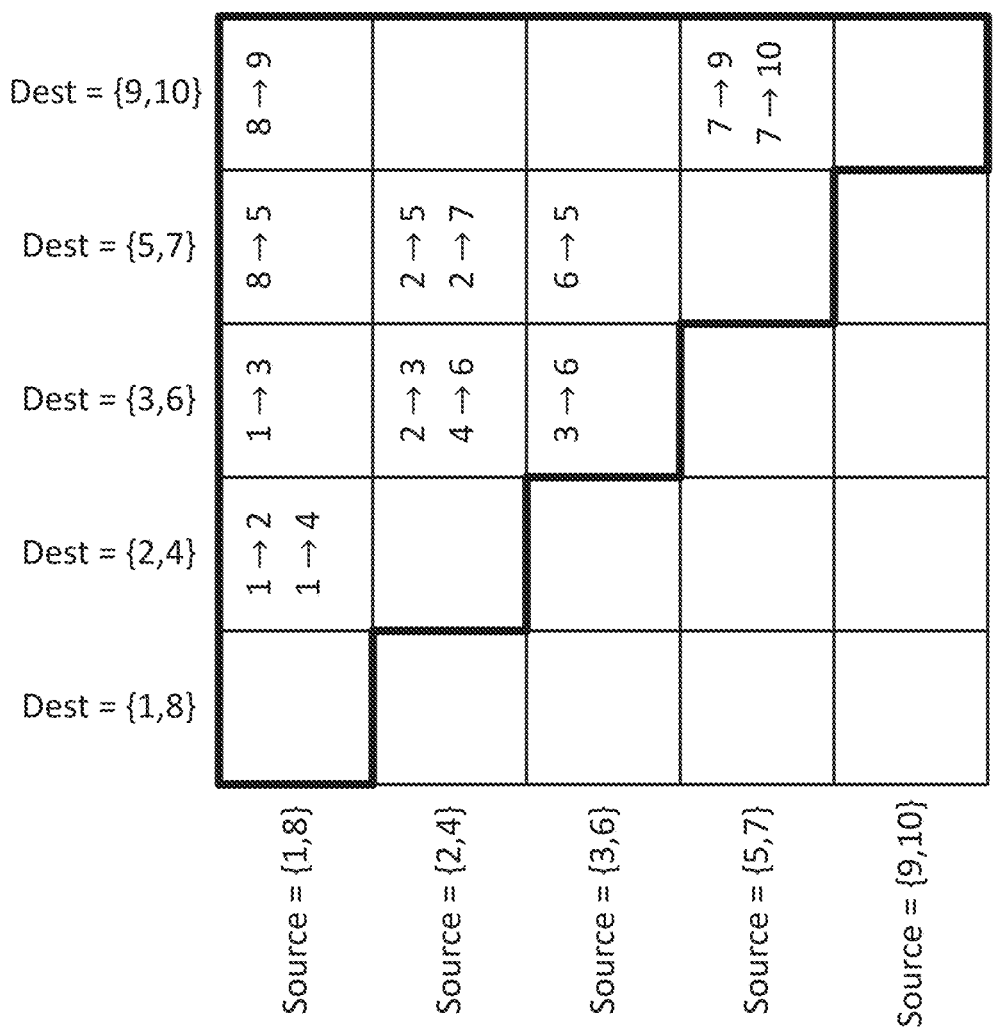
FIG. 15 illustrates an example embodiment of a grid for analyzing an iterative graph partitioning technique in accordance with example embodiments of the disclosure.

FIG. 15 illustrates an example embodiment of a grid for analyzing an iterative graph partitioning technique in accordance with example embodiments of the disclosure.

The embodiments illustrated in FIGS. 14 and 15 may be used for example, with the method illustrated in FIG. 13.

Referring to part (a) of FIG. 14, an original graph may include vertices 1-10 (which may also be referred to as nodes) and associated edges indicated with arrows. A table illustrating five empty partitions is shown below the graph. Part (b) of FIG. 14 shows the graph and table at a first iteration. Vertices 1 and 8, which have no incoming edges, may be placed in Partition 1. Vertices 9 and 10, which have no outgoing edges, may be placed in Partition 5. Vertices 1, 8, 9, and 10 may then be deleted from the graph along with their associated edges. The remaining graph is illustrated in part (c) of FIG. 14 which shows the graph and table at a second iteration. Vertices 2 and 4, which may now have few or no incoming edges, may be placed in Partition 2, and vertices 5 and 7, which may now have few or no outgoing edges, may be placed in Partition 4. Vertices 2, 4, 5, and 7 may then be deleted from the graph along with their associated edges. The remaining graph is illustrated in part (d) of FIG. 14 which shows the graph and table at a final iteration. The remaining vertices 3 and 6 may be placed in the remaining Partition 3 and deleted from the graph along with their associated edges.

After the vertices are placed in P partitions (in this example, P=5), the edges may be placed in a P×P (in this example, 5×5) grid of blocks as shown in FIG. 15.

In some embodiments, for edges located in the upper right portion of the grid (surrounded by the heavy line) in FIG. 15, a current iteration may calculate future values (or portions of future values) for their associated vertices, and therefore, they may not need to be processed in the next iteration. The sources of the blocks in the upper right portion of the grid may already have already been processed when the graphing algorithm would otherwise process those edges during the next iteration. For example, in an embodiment in which the graph processing algorithm may be implemented as a summing function, for edge 1→2, it a new value of vertex 1 is calculated during the previous iteration, the value of vertex 1 may be used to update the value of vertex 2 (e.g., by feeding in the sum) which may be propagated to the current iteration. Thus, edge 1→2 may not need to be read again during the current iteration.

The example illustrated in FIGS. 14 and 15 may achieve 100 percent cross-propagation, for example, because all of the edges may be located in the upper right portion of the grid.

As described above, in some embodiments, rather than the static partitioning techniques described with respect to FIGS. 8-11, an iterative partitioning technique in accordance with example embodiments of the disclosure may place vertices more intelligently in partitions, which may increase the likelihood of data propagation from one or more vertices within a partition to other vertices within the same partition and/or across other partitions. For example, a partitioning technique in accordance with example embodiments of the disclosure may attempt to increase the number of vertices that may not need to read by considering the vertices that have already been assigned to a partition. At an iteration of the partitioning algorithm, if a vertex has already been placed in a partition during a previous iteration, it may not affect cross-propagation in the remaining portion of the graph. Therefore, edges associated with vertices that have been placed in a partition during a previous iteration may be deleted from the graph, and the next iteration of the partitioning algorithm may be run on the remaining portion of the graph.

Figure 16:
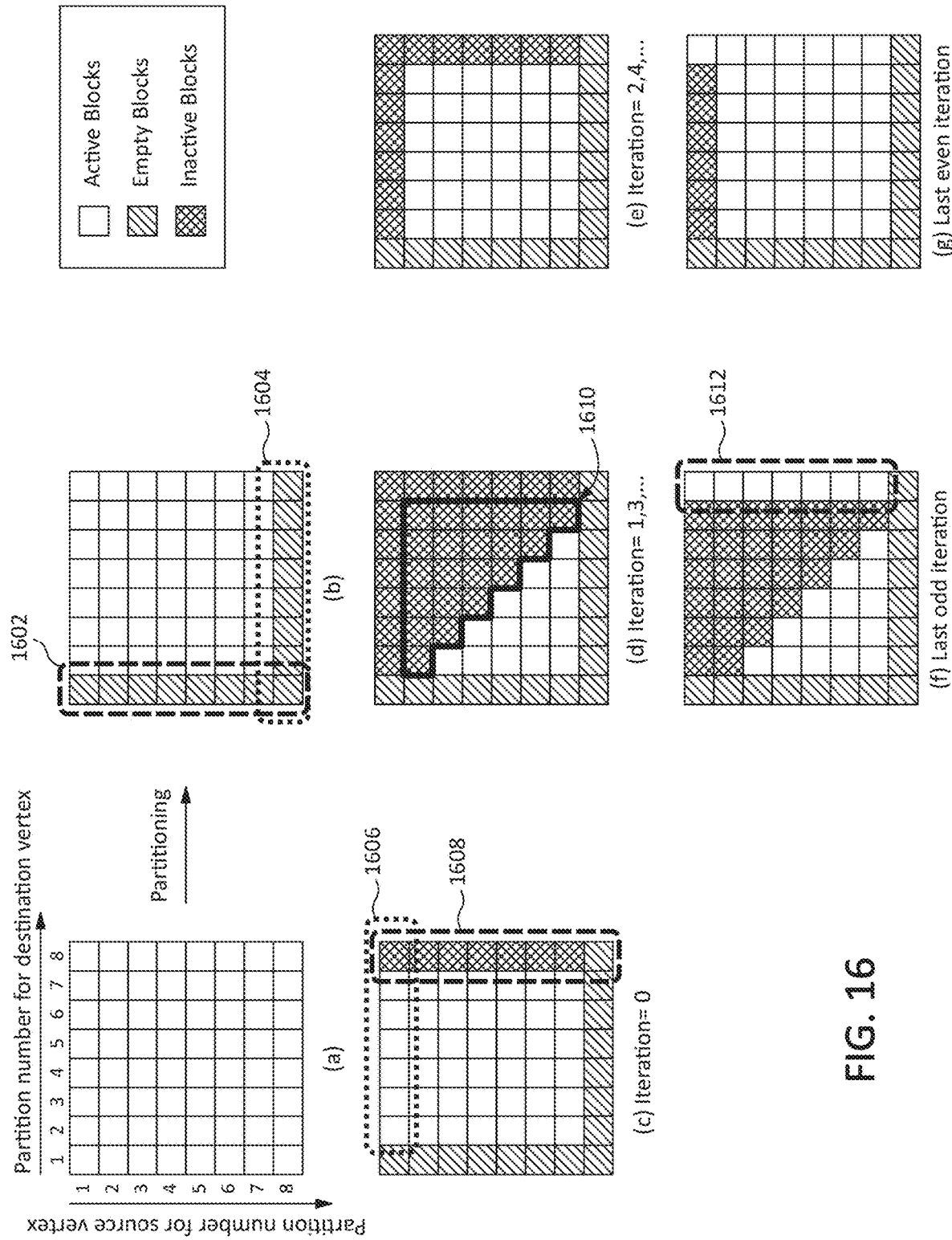
FIG. 16 illustrates an example embodiment of a graph partitioning and processing method in accordance with example embodiments of the disclosure.

FIG. 16 illustrates an example embodiment of a graph partitioning and processing method in accordance with example embodiments of the disclosure. The embodiment illustrated in FIG. 16 may illustrate the flow of an application running on a graph that may be divided into eight partitions (P=8). In this example, the graph processing system may process partitions in numerical order based on the partition number.

Part (a) of FIG. 16 illustrates an initially empty 8×8 grid of blocks with partition numbers i for source vertices indicated along the vertical axis, and partition numbers j for destination vertices indicated along the horizontal axis. Thus, each block i,j may contain data for edges from source i to destination j.

In FIG. 16, active blocks, which may be used for updating vertices during the current iteration, may be indicated without shading. Empty blocks, which may be empty, for example, due to the partitioning technique, may be indicated by single-hatch shading. Inactive blocks, which may not be used for updating vertices during the current iteration, for example, because they were used for updating during a previous iteration, may be indicated by cross-hatch shading.

Part (b) of FIG. 16 illustrates the grid after partitioning, for example, with an iterative topology-based technique in accordance with example embodiments of the disclosure. Because the first partition may only contain vertices with no in-edges, the first column (j=1) indicated by the dashed line 1602 may be empty, and therefore, their associated vertices may not be read. Similarly, because the last partition may only contain vertices with no out-edges, the last row (i=8) indicated by the dotted line 1604 may be empty, and therefore, their associated vertices may not be read.

Referring to part (c) of FIG. 16, during a first iteration (Iteration 0), data for edges in the active blocks may be read and their associated vertices may be updated. This may include the vertices in Partition 1 and/or their associated edge data (row i=1 indicated by dotted line 1606). However, in some embodiments, this may be the only iteration during which the vertices in Partition 1 may be processed because they may have no incoming edges, and therefore, their values may not change during future iterations. Thus, in some embodiments, vertices in Partition 1 and/or their associated edge data may not be read and/or processed after the first iteration (Iteration 0).

Moreover, the vertices in the last partition (Partition 8) and/or their associated edge data (column j=8 indicated by dashed line 1608) may not be processed until the final iteration because the vertices in the last partition may not affect the value of other vertices due to their lack of outgoing edges. Thus, in some embodiments, the vertices in the last partition may only be updated after all other vertices have been updated.

In some embodiments, the first and last partitions may contain 40 percent or more of the vertices. Thus, placing vertices with no incoming edges in the first partition and/or placing vertices with no outgoing edges in the last partition may provide a significant improvement in throughput, energy efficiency, and/or the like because it may reduce the I/O accesses and/or processing cycles associated with the vertices in the first and last partitions.

Referring to part (d) of FIG. 16, during a second iteration (Iteration 1) and/or subsequent odd iterations, only edge data for the triangular group of active blocks on the lower left may be read and their associated vertices updated. The edge data for the group of blocks enclosed by the heavy line 1610 may not be read and their associated vertices may not be updated because, for example, the source may be processed before the destination and therefore may have already been calculated during a previous iteration. Once again, the inactive blocks along the top row (i=1) may not be processed because they may only be processed during the first iteration, and the inactive blocks along the right column (j=8) may not be processed because they may only be processed during the final iteration. For example, for During Iteration 1, blocks from source 1 to destination 5 may not be calculated because their future values may already have been calculated during iteration 0.

Referring to part (e) of FIG. 16, during a third iteration (Iteration 2) and/or subsequent even iterations, edge data for the square section of active blocks may be read and their associated vertices updated. Once again, the inactive blocks along the top row (i=1) may not be processed because they may only be processed during the first iteration, and the inactive blocks along the right column (j=8) may not be processed because they may only be processed during the final iteration.

Referring to part (f) of FIG. 16, during a final odd iteration, edge data for the triangular group of active blocks on the lower left may be read and their associated vertices updated. Additionally, as mentioned above, because this may be a final iteration, the edge data for the blocks in the last row (j=8) may be read and the vertices in the last partition (P=8) may be updated.

Referring to part (g) of FIG. 16, during a final even iteration, edge data for the square section of active blocks may be read and their associated vertices updated. Additionally, as mentioned above, because this may be a final iteration, the edge data for the blocks in the last row (j=8) may be read and the vertices in the last partition (P=8) may be updated.

As described above, in some embodiments in accordance with example embodiments of the disclosure, an iterative topology based partitioning technique may assign vertices into partitions that may increase the number of edges that may not need to be read in a subsequent iteration. Moreover, results for vertices with a low number of incoming edges may be propagated to other partitions and thus may not be calculated during a subsequent iteration. Additionally, the disclosed techniques may reduce the number of I/O requests. Depending on the implementation details, any or all of these techniques may improve the overall performance of a graph processing system. Moreover, in some embodiments, a partitioning technique in accordance with example embodiments of the disclosure may be well-suited for operation on a near-storage processing platform as described below.

The operations of any of the methods, techniques, processes, and/or the like described herein may be implemented with hardware, software, or any combination thereof. For example, in some embodiments, any of the operations may be implemented with combinational logic, sequential logic, one or more timers, counters, registers, state machines, volatile memories such as dynamic random access memory (DRAM) and/or static random access memory (SRAM), nonvolatile memory such as flash memory, CPLDs, FPGAs, ASICs, CISC processors and/or RISC processors, and/or the like executing instructions, and/or the like, as well as GPUs, MPUs, and/or the like. In some embodiments, any of the methods, techniques, processes, and/or the like described herein may be implemented with, and/or used in connection with, one or more servers, server chassis, server racks, datarooms, datacenters, edge data centers, mobile edge datacenters, and/or any combination thereof.

Synchronization Overhead

Figure 17:
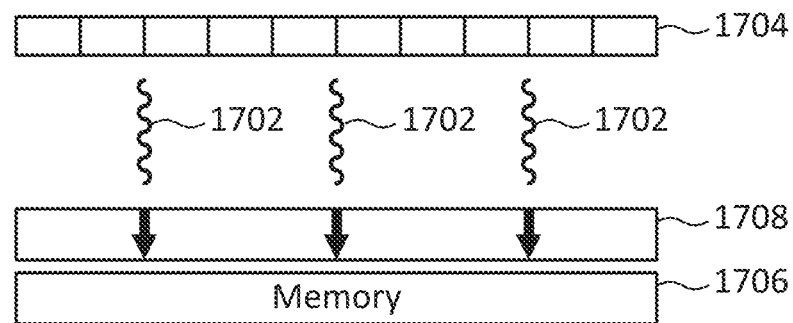
FIG. 17 illustrates an embodiment of a multi-threaded update operation for graph processing using atomic memory writes in accordance with example embodiments of the disclosure.

FIG. 17 illustrates an embodiment of a multi-threaded update operation for graph processing using atomic memory writes in accordance with example embodiments of the disclosure. In the embodiment illustrated in FIG. 17, multiple threads 1702 may write updates from an update buffer 1704 into memory 1706 using atomic memory writes 1708. In some situations, two vertices may be updated at the same time. Therefore, atomic memory writes may be used, for example, to prevent a write operation performed by one thread from corrupting a write operation performed by another thread. In some embodiments, the use of atomic write operations may slow down graph processing, for example, because one thread may wait for another thread to finish an atomic memory write. This may lead to poor scalability, for example, with increasing numbers of threads. Depending on the implementation details, the use of a large number of threads may actually slow down graph processing compared to a single thread because of the synchronization overhead associated with threads waiting for other threads to finish atomic memory writes.

Figure 18:
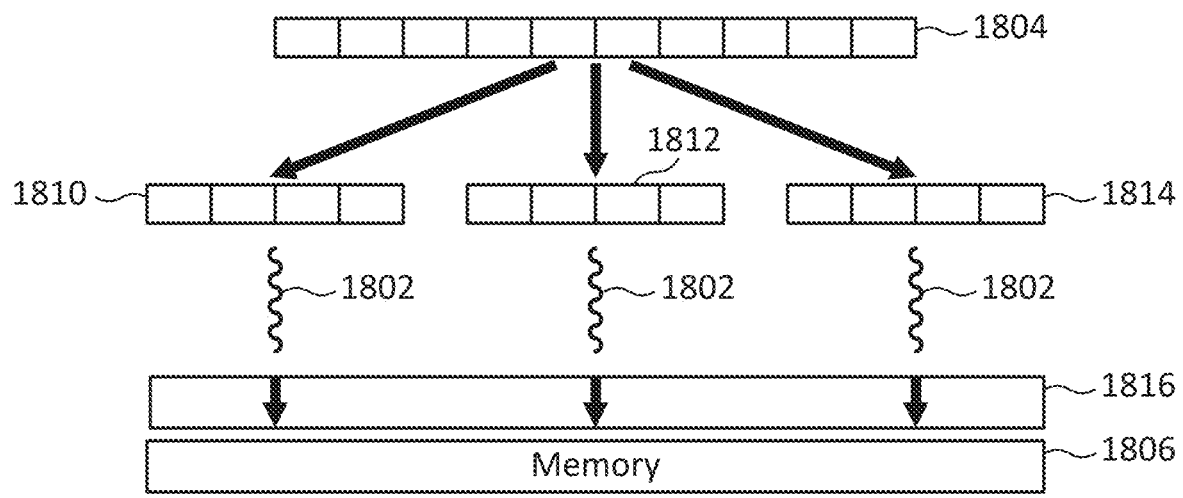
FIG. 18 illustrates an embodiment of a multi-threaded update operation with multiple update buffers for graph processing in accordance with example embodiments of the disclosure.

FIG. 18 illustrates an embodiment of a multi-threaded update operation with multiple update buffers for graph processing in accordance with example embodiments of the disclosure. In the embodiment illustrated in FIG. 18, the updates 1804 may be divided between multiple update buffers 1810, 1812, and 1814, for example, based on different vertex ranges. Threads 1802, which may be assigned one per buffer, may then write the updates to memory 1806 using non-atomic memory writes 1816. In some embodiments, and depending on the implementation details, no atomic write operations may be used, for example, because each thread may only write data from its corresponding buffer. Thus, synchronization overhead may be eliminated, which may enable a graph processing operation to scale with a large number of threads. In some embodiments, depending on the implementation details, synchronization overhead may be reduced rather than eliminated.) Although the embodiment illustrated in FIG. 18 may be illustrated with three buffers and three threads, any number of buffers and/or threads may be used.

Processing Pipeline

Figure 19:
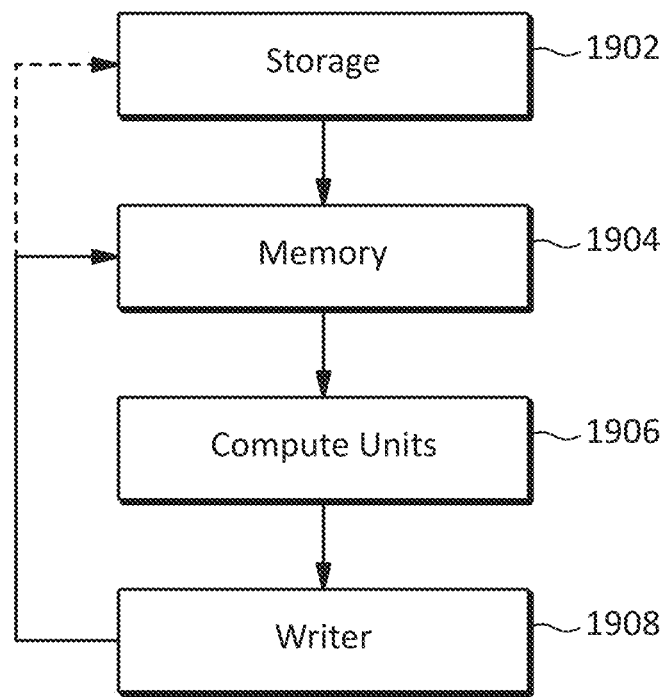
FIG. 19 illustrates an embodiment of a graph processing pipeline in accordance with example embodiments of the disclosure.

FIG. 19 illustrates an embodiment of a graph processing pipeline in accordance with example embodiments of the disclosure. The embodiment illustrated in FIG. 19 may include a storage device 1902, a memory 1904, two or more compute units 1906, and one or more writers 1908. A first one of the compute units 1906 may be configured to receive first vertex data and first edge data associated with the first vertex data from the memory 1904 and generate a first update. A second one of the compute units 1906 may be configured to receive second vertex data and second edge data associated with the second vertex data from the memory 1904 and generate a second update. The writer 1908 may be configured to write the first update to the memory 1904.

In some embodiments, the memory 1904 may be configured to receive the first vertex data, first edge data, second vertex data, and second edge data from the storage device 1902. In some embodiments, the writer 1908 may be configured to write at least a portion of the first update to the storage medium based, for example, on a utilization of the memory such as the memory 1904 or a bank or other portion thereof being full.

An update may refer to a full or partial update, for example when a vertex for one incoming edge may be propagated but not another incoming edge. Thus, in some embodiments, the updates may include partial aggregations and/or other processing operations. Moreover, some embodiments may implement graph processing algorithms that may include edge weights and/or other elements that may involve values and/or calculations for edges.

The operations and/or components described with respect to the embodiment illustrated in FIG. 19, as well as all of the other embodiments described herein, are example operations and/or components. In some embodiments, some operations and/or components may be omitted and/or other operations and/or components may be included, Moreover, in some embodiments, the temporal and/or spatial order of the operations and/or components may be varied. Although some components may be illustrated as individual components, in some embodiments, some components shown separately may be integrated into single components, and/or some components shown as single components may be implemented with multiple components.

The storage device 1902 may be implemented with any type of storage apparatus including SSDs, hard disk drives (HDDs), optical drives, drives based on any type of persistent memory such as cross-gridded nonvolatile memory with bulk resistance change, and/or the Ike, and/or any combination thereof. The memory 1904 may be implemented any suitable memory including DRAM, SRAM, EEPROM including flash memory, persistent memory such as cross-gridded nonvolatile memory with bulk resistance change, and/or the like, and/or any combination thereof. The two or more compute units 1906 and one or more writers 1908 may be implemented with hardware, software, or any combination thereof including combinational logic, sequential logic, one or more timers, counters, registers, state machines, CPLDs FPGAs, ASICs, CISC processors and/or RISC processors, and/or the like executing instructions stored in volatile memories such as DRAM and/or SRAM, nonvolatile memory such as flash memory, and/or the like, as well as GPUs, NPUs, and/or the like.

The embodiment illustrated in FIG. 19 may be implemented in any form or configuration, for example, a storage device having a form factor such as 3.5 inch, 2.5 inch, 1.8 inch, M.2, and/or the like, and/or using any connector configuration such as Serial ATA (SATA), Serial Attached SCSI (SAS), U.2, and/or the like. As another example, the embodiment illustrated in FIG. 19 may be implemented entirely or partially as an add-in card such as a half-height or full-height Peripheral Component Interconnect Express (PCIe) add-in card. Some embodiments may be implemented entirely or partially with, and/or used in connection with, a server chassis, server rack, dataroom, datacenter, edge datacenter, mobile edge datacenter, and/or any combinations thereof, and/or the like.

Some embodiments may implement partitioning and graph processing using two applications. For example, a host may implement partitioning using a first application, and a kernel may implement graph processing using a second application which may run on a pipeline such as the embodiment illustrated in FIG. 19. In some embodiments, the host application may migrate data into global memory, assign inputs to the kernel, and/or trigger execution of the kernel. The kernel may perform computations for a graph processing algorithm using the data from the host and update the results in global memory.

Figure 20:
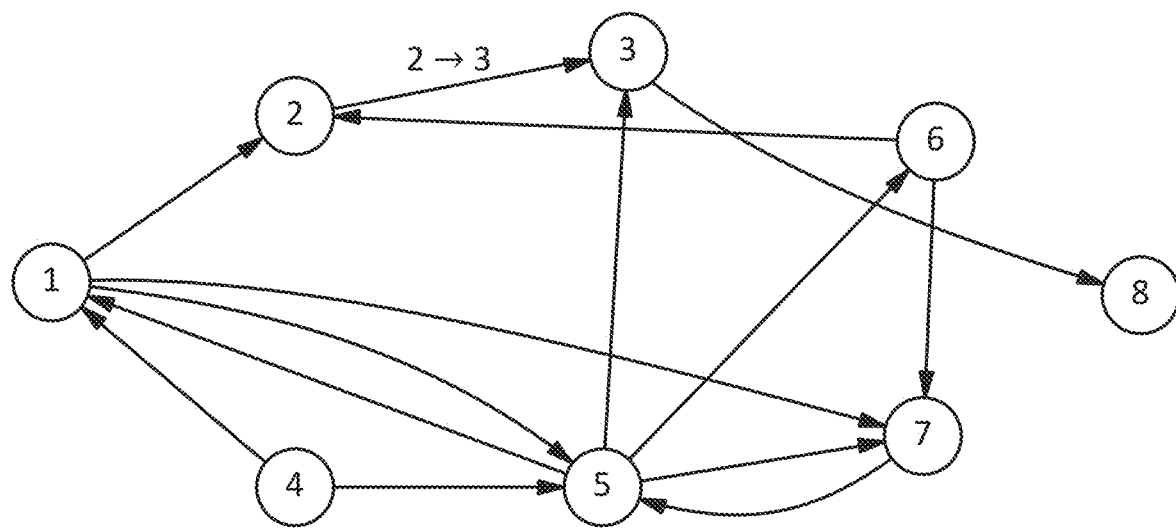
FIG. 20 illustrates an example embodiment of a graph in accordance with example embodiments of the disclosure.
Figure 21A:
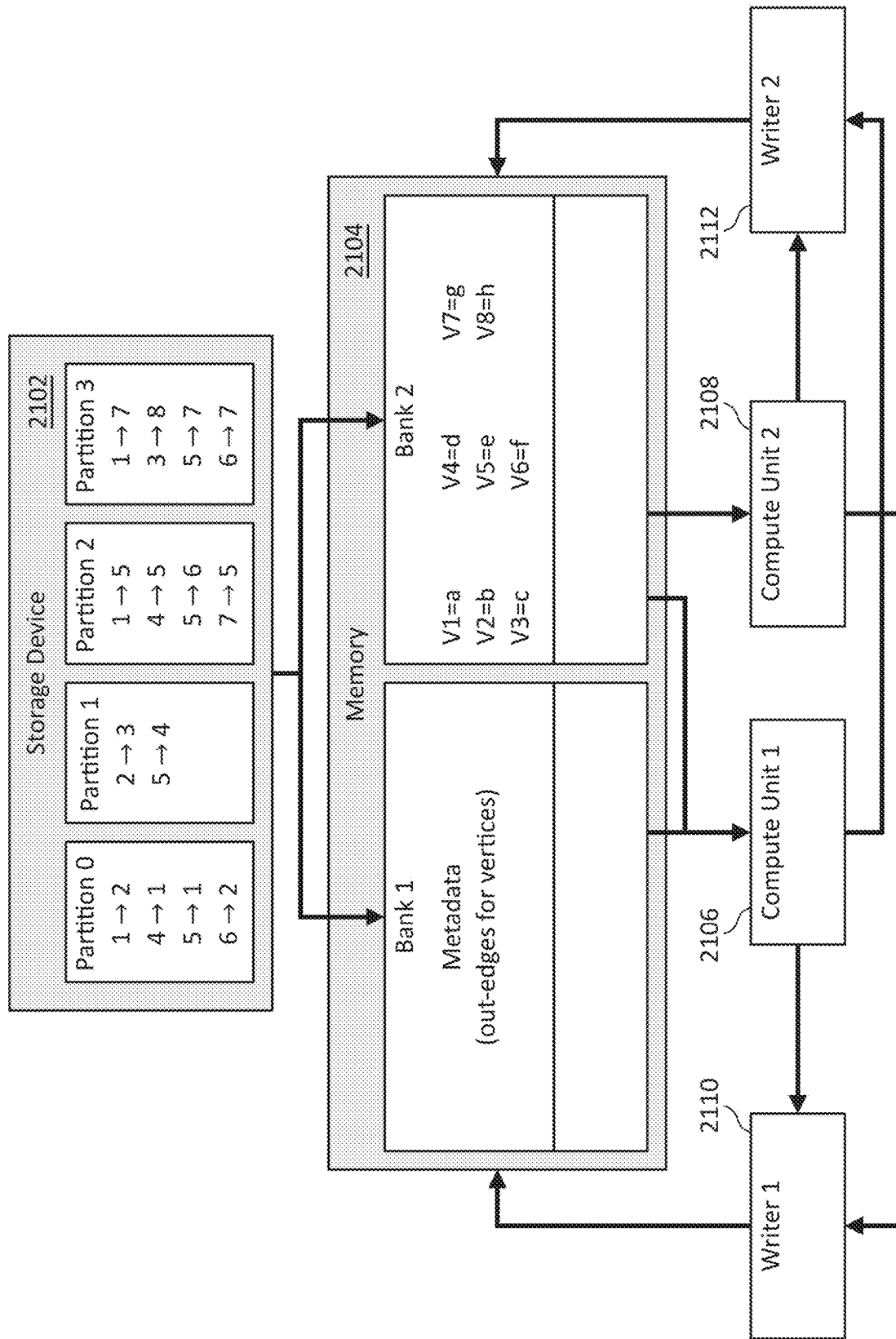
FIG. 21A illustrates an example embodiment of a graph processing pipeline and method in an initial condition in accordance with example embodiments of the disclosure.
Figure 21B:
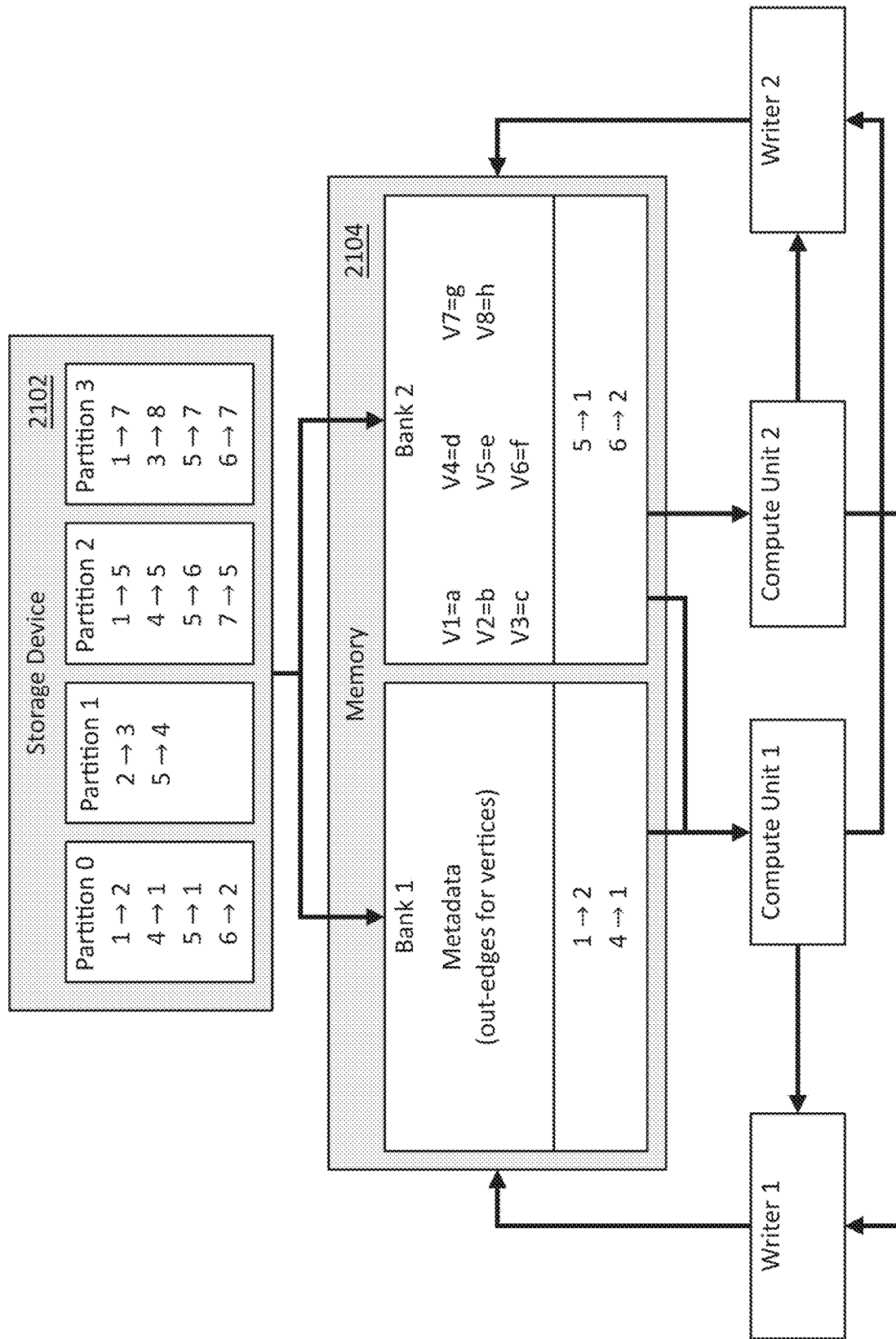
FIG. 21B illustrates an example embodiment of a graph processing pipeline and method in which one or more edges from a first partition may be read into one or more banks in accordance with example embodiments of the disclosure.
Figure 21C:
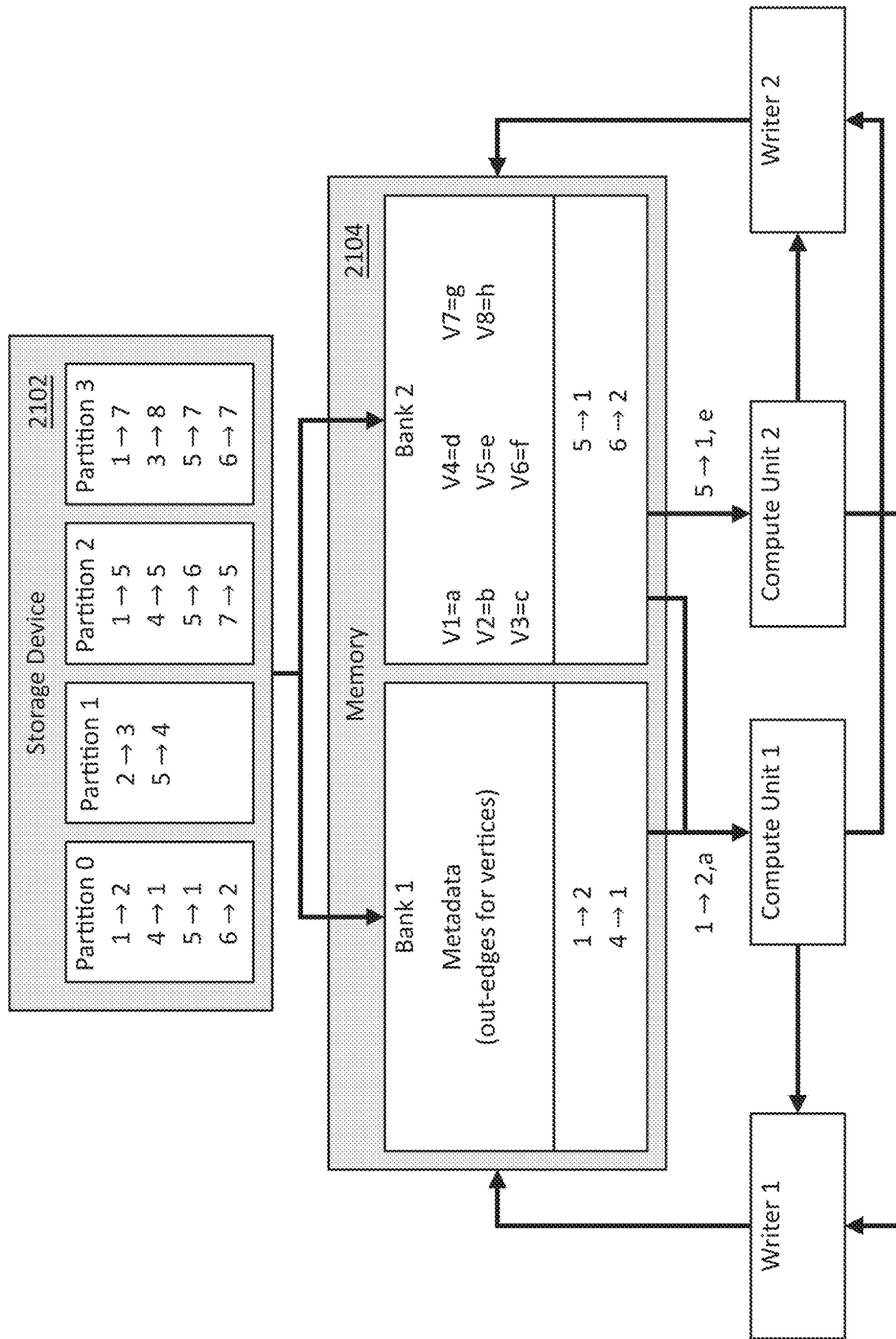
FIG. 21C illustrates an example embodiment of a graph processing pipeline and method in which one or more edges for a first partition may be streamed to one or more compute units in accordance with example embodiments of the disclosure.
Figure 21D:
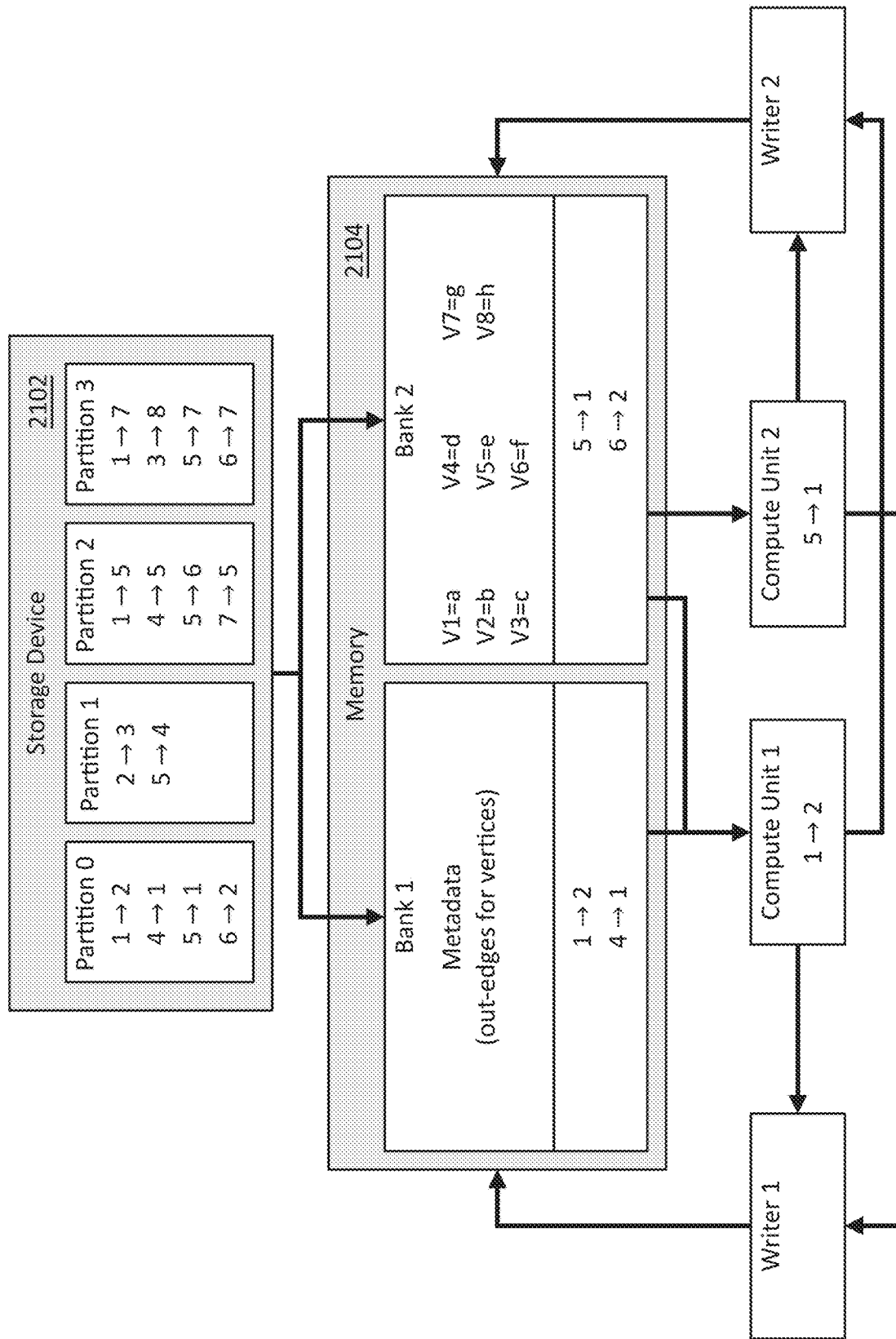
FIG. 21D illustrates an example embodiment of a graph processing pipeline and method in which one or more compute units may create one or more update packets for a first partition in accordance with example embodiments of the disclosure.
Figure 21E:
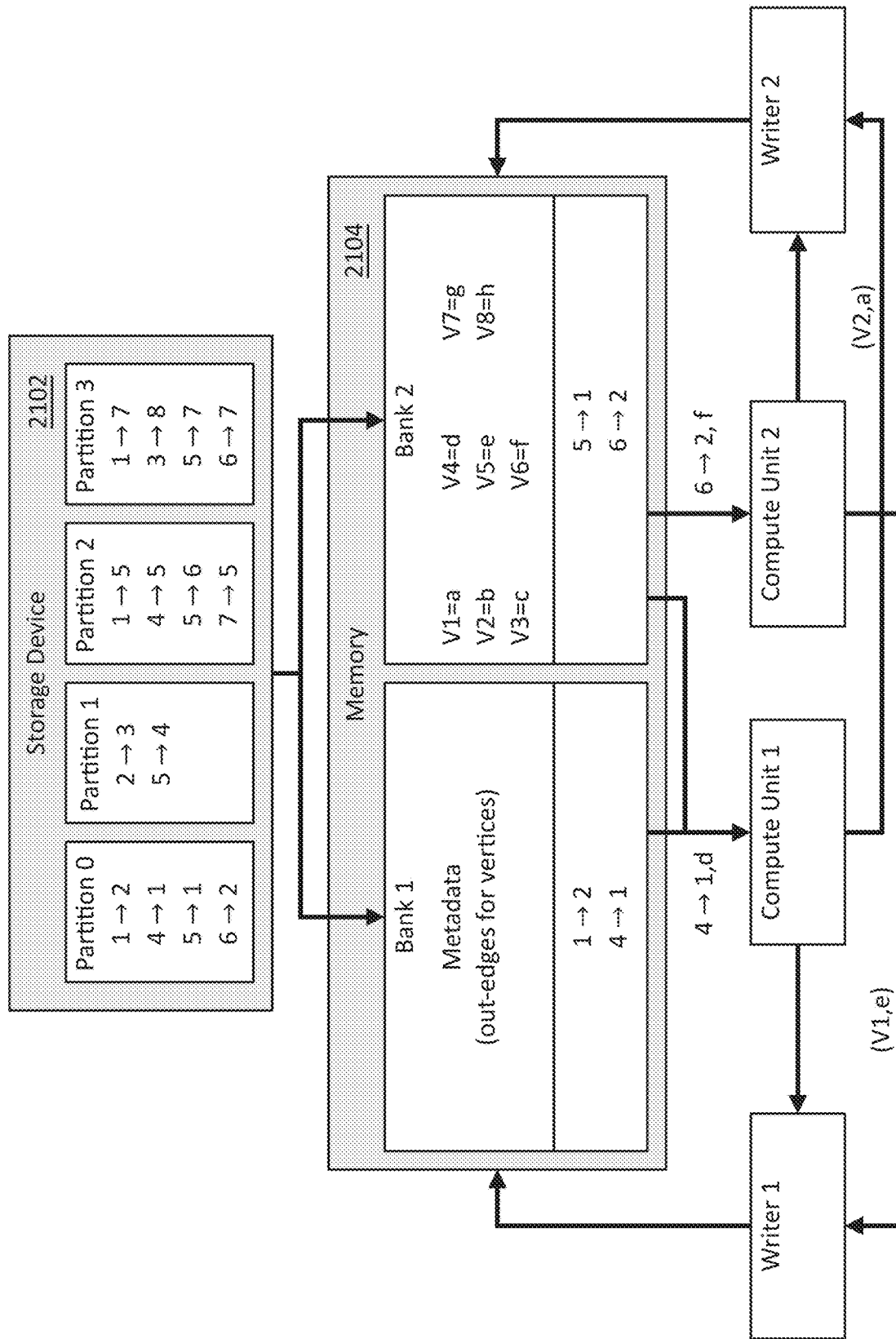
FIG. 21E illustrates an example embodiment of a graph processing pipeline and method in which one or more update packets for a first partition may be streamed from one or more compute units to one or more writers in accordance with example embodiments of the disclosure.
Figure 21F:
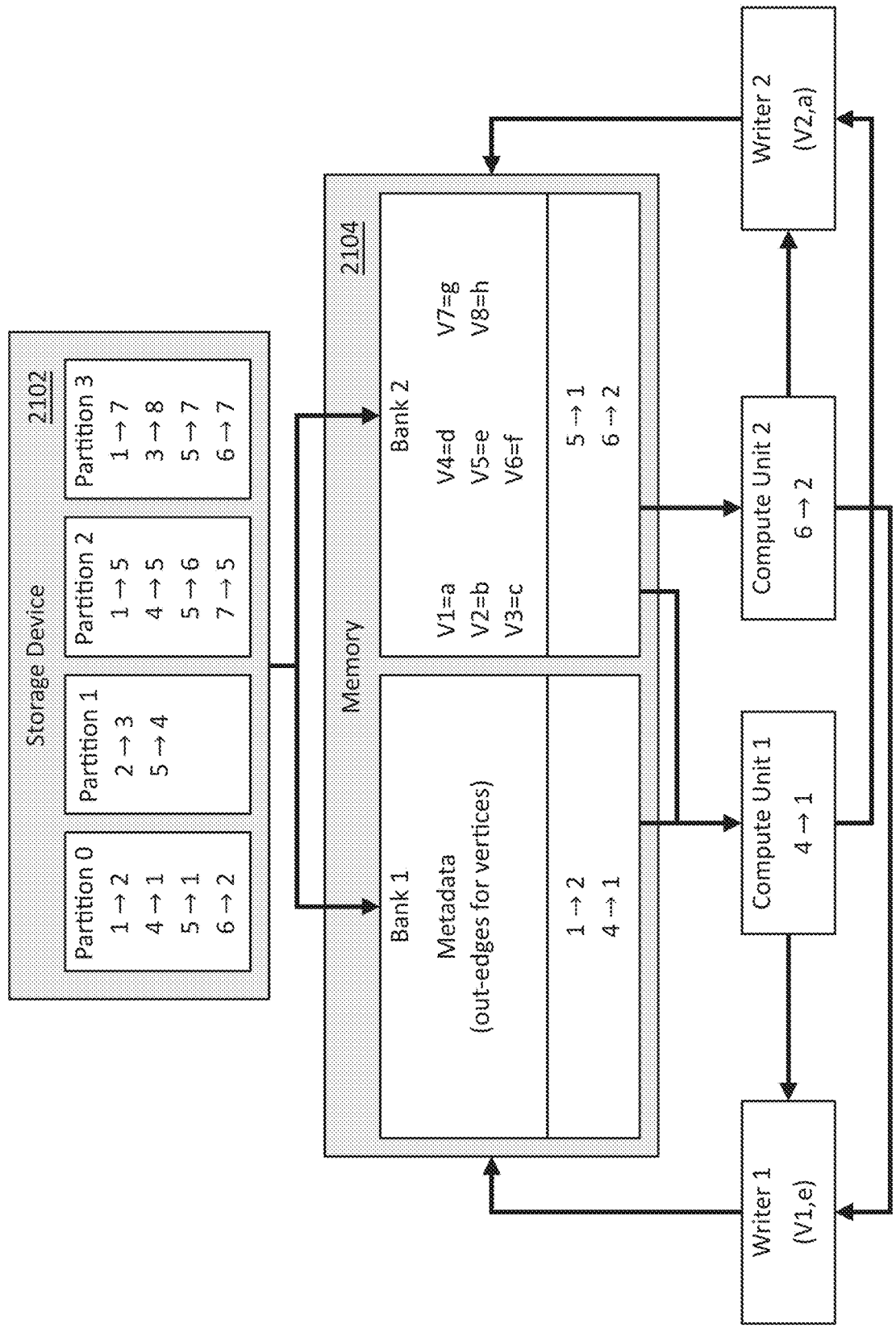
FIG. 21F illustrates an example embodiment of a graph processing pipeline and method in which one or more update packets for a first partition may have arrived at one or more writers in accordance with example embodiments of the disclosure.
Figure 21G:
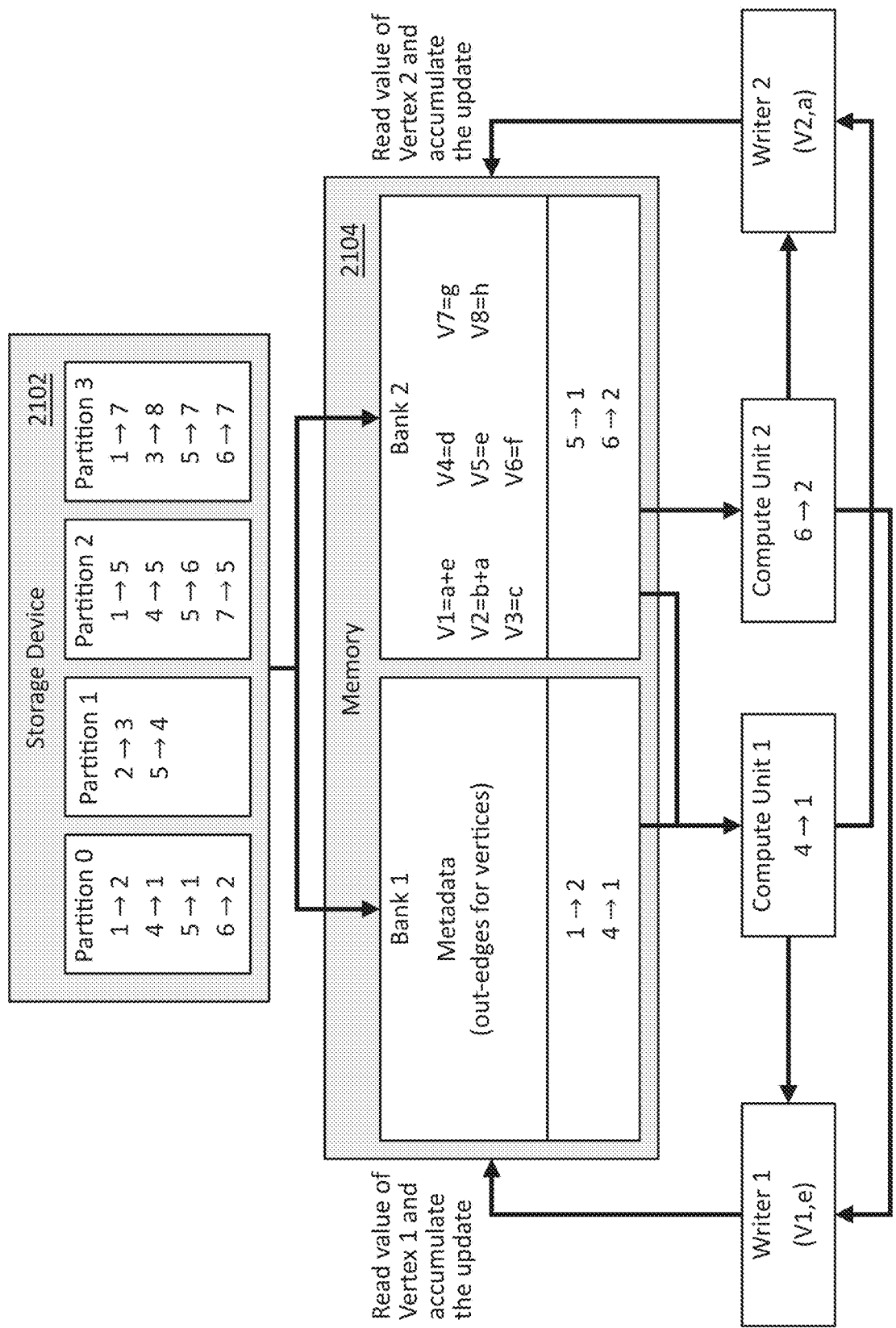
FIG. 21G illustrates an example embodiment of a graph processing pipeline and method in which one or more writers may use one or more update packets for a first partition to accumulate updates for one or more vertices in accordance with example embodiments of the disclosure.
Figure 21H:
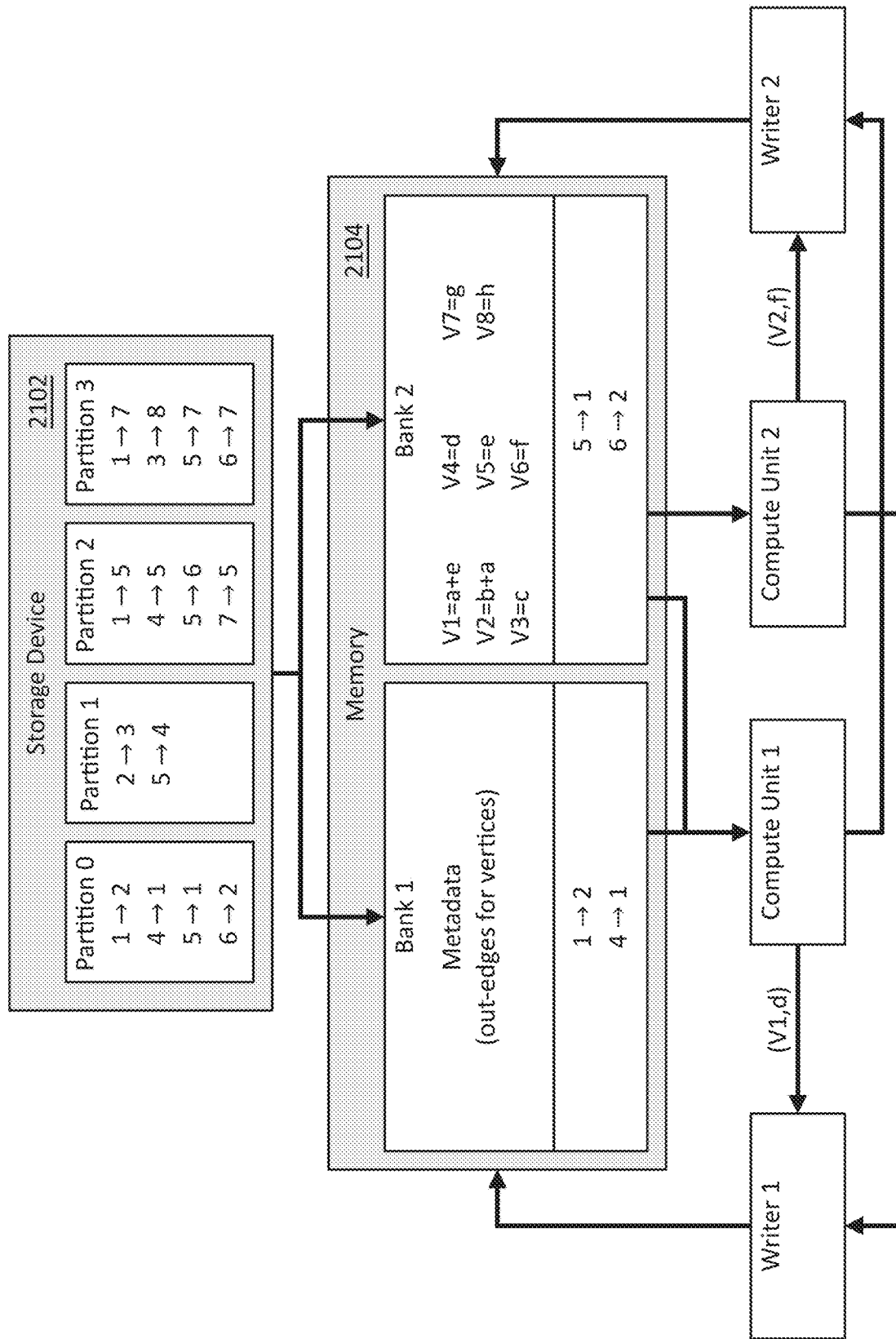
FIG. 21H illustrates an example embodiment of a graph processing pipeline and method in which one or more update packets for a first partition may be streamed from one or more compute units to one or more writers in accordance with example embodiments of the disclosure.
Figure 21I:
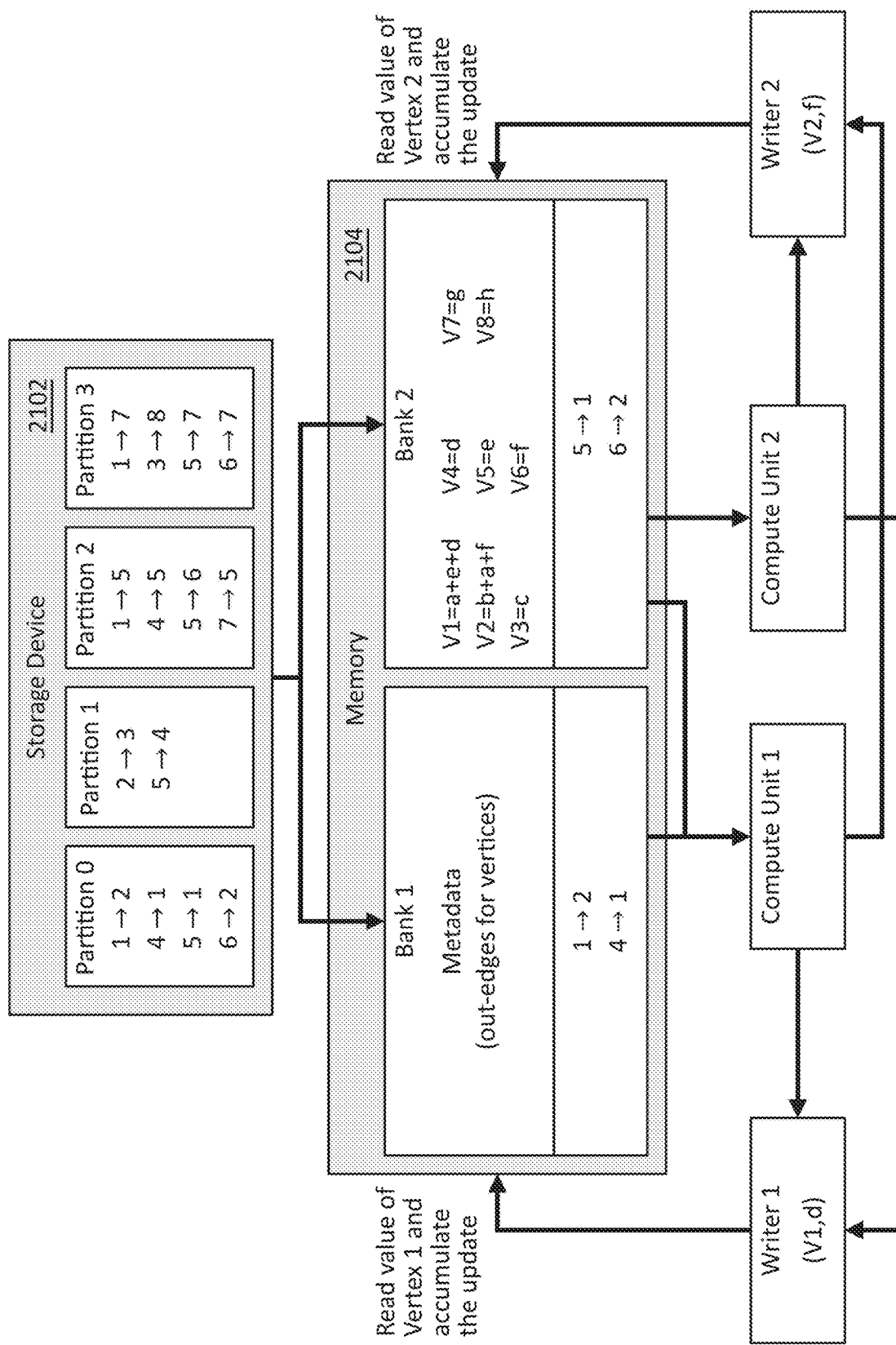
FIG. 21I illustrates an example embodiment of a graph processing pipeline and method in which one or more writers may use one or more update packets for a first partition to accumulate updates for one or more vertices in accordance with example embodiments of the disclosure.
Figure 21J:
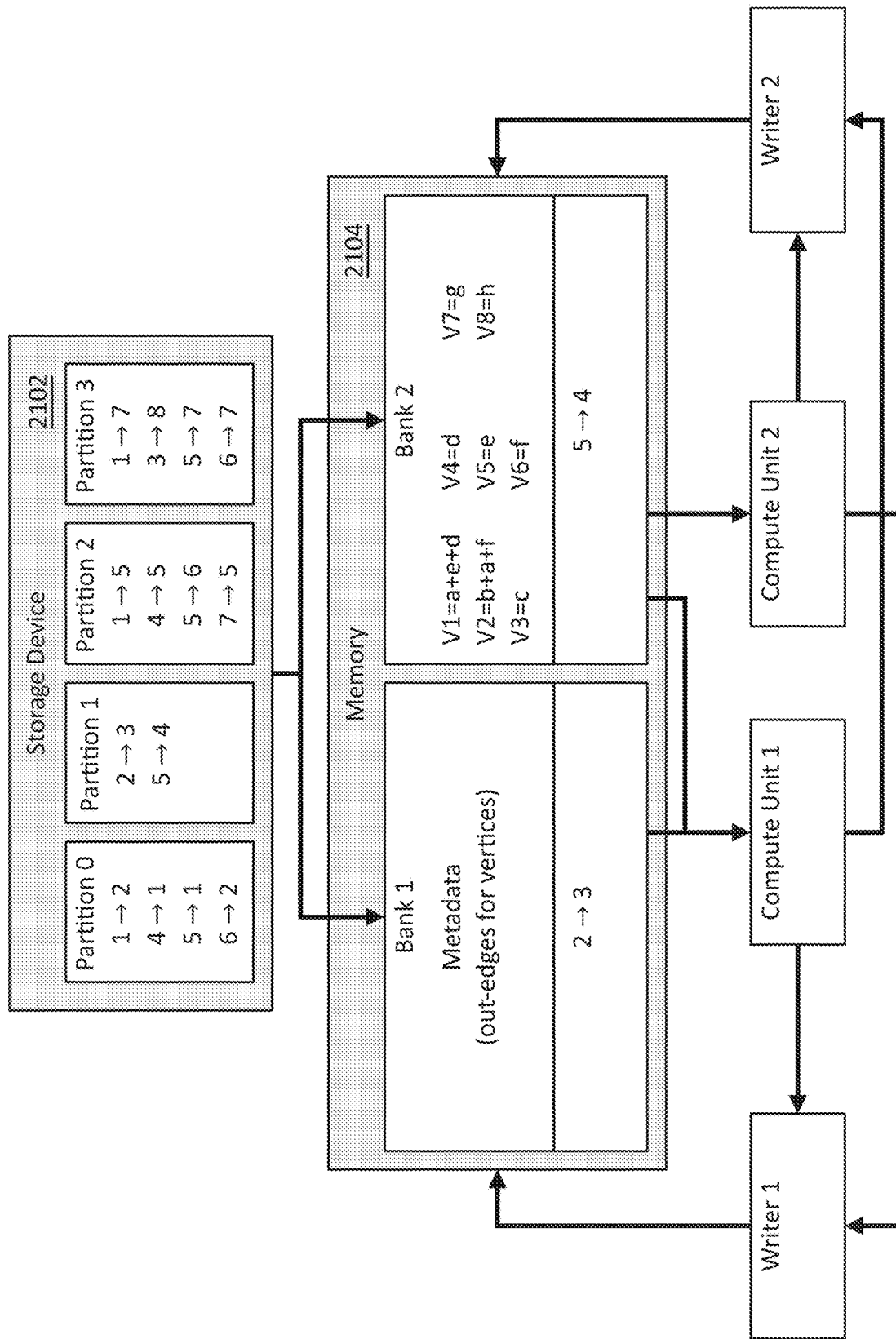
FIG. 21J illustrates an example embodiment of a graph processing pipeline and method in which one or more edges for a second partition may be read into one or more banks in accordance with example embodiments of the disclosure.
Figure 21K:
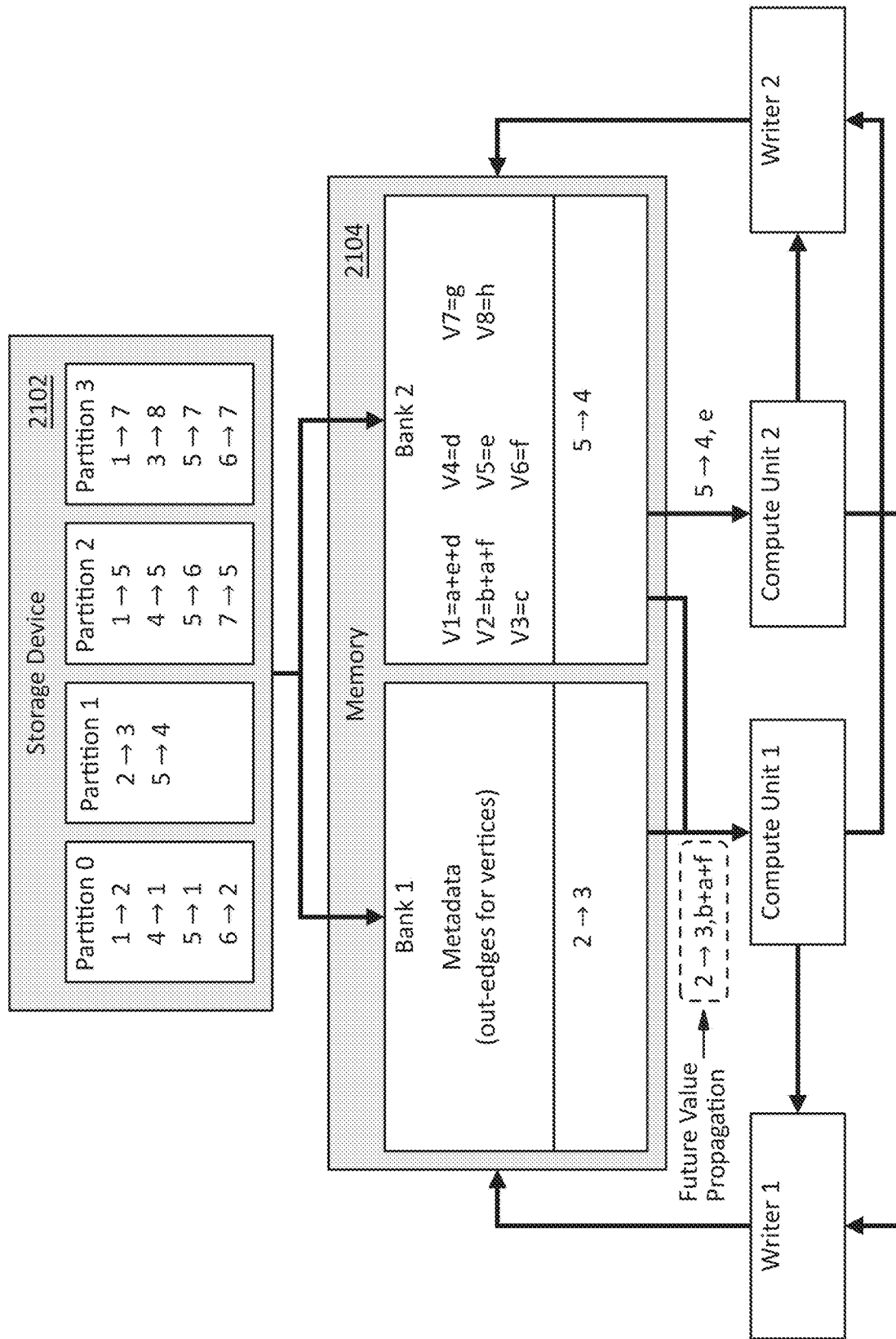
FIG. 21K illustrates an example embodiment of a graph processing pipeline and method in which one or more edges for a second partition may be streamed to one or more compute units in accordance with example embodiments of the disclosure.
Figure 21L:
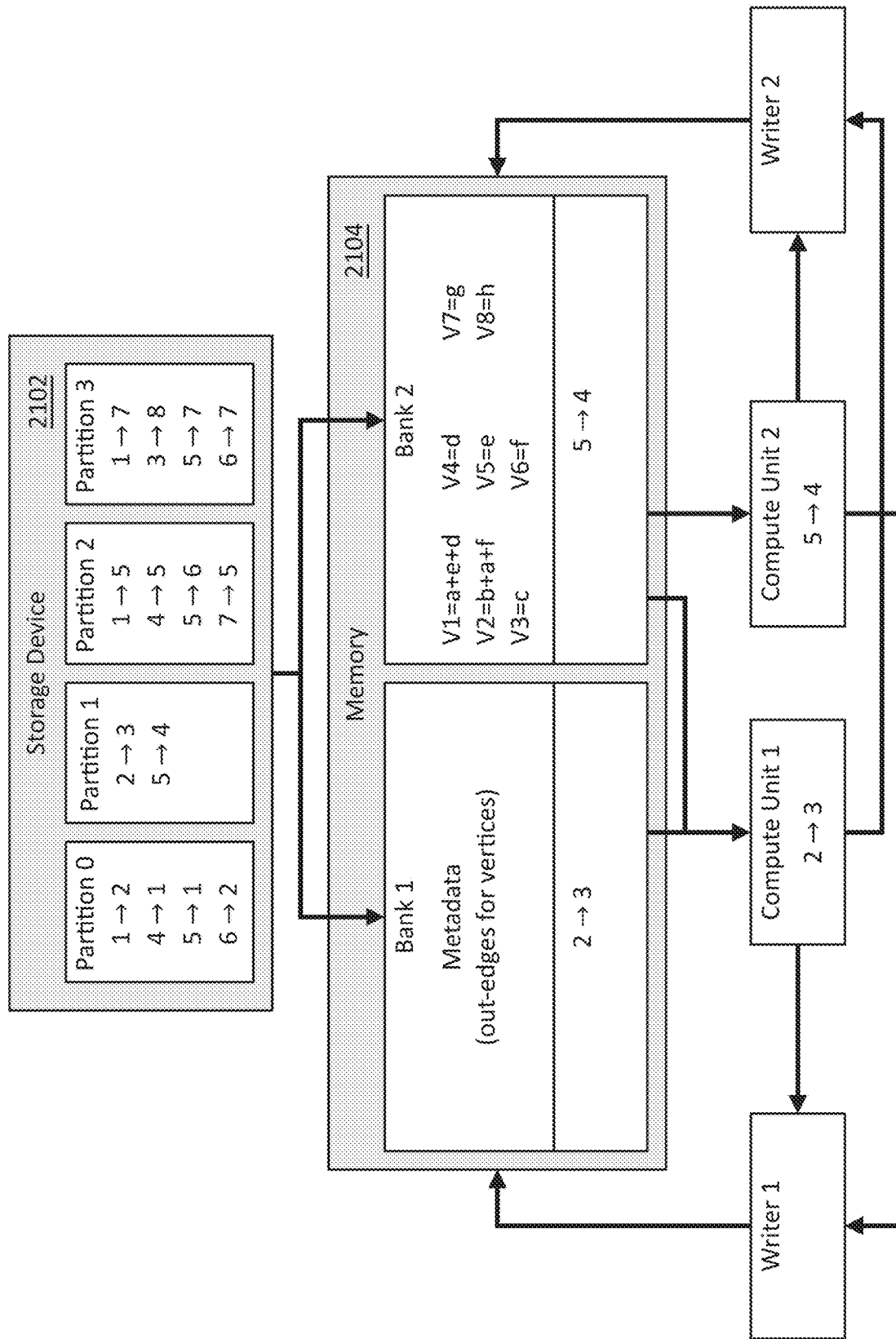
FIG. 21L illustrates an example embodiment of a graph processing pipeline and method in which one or more compute units may create one or more update packets for a second partition in accordance with example embodiments of the disclosure.
Figure 21M:
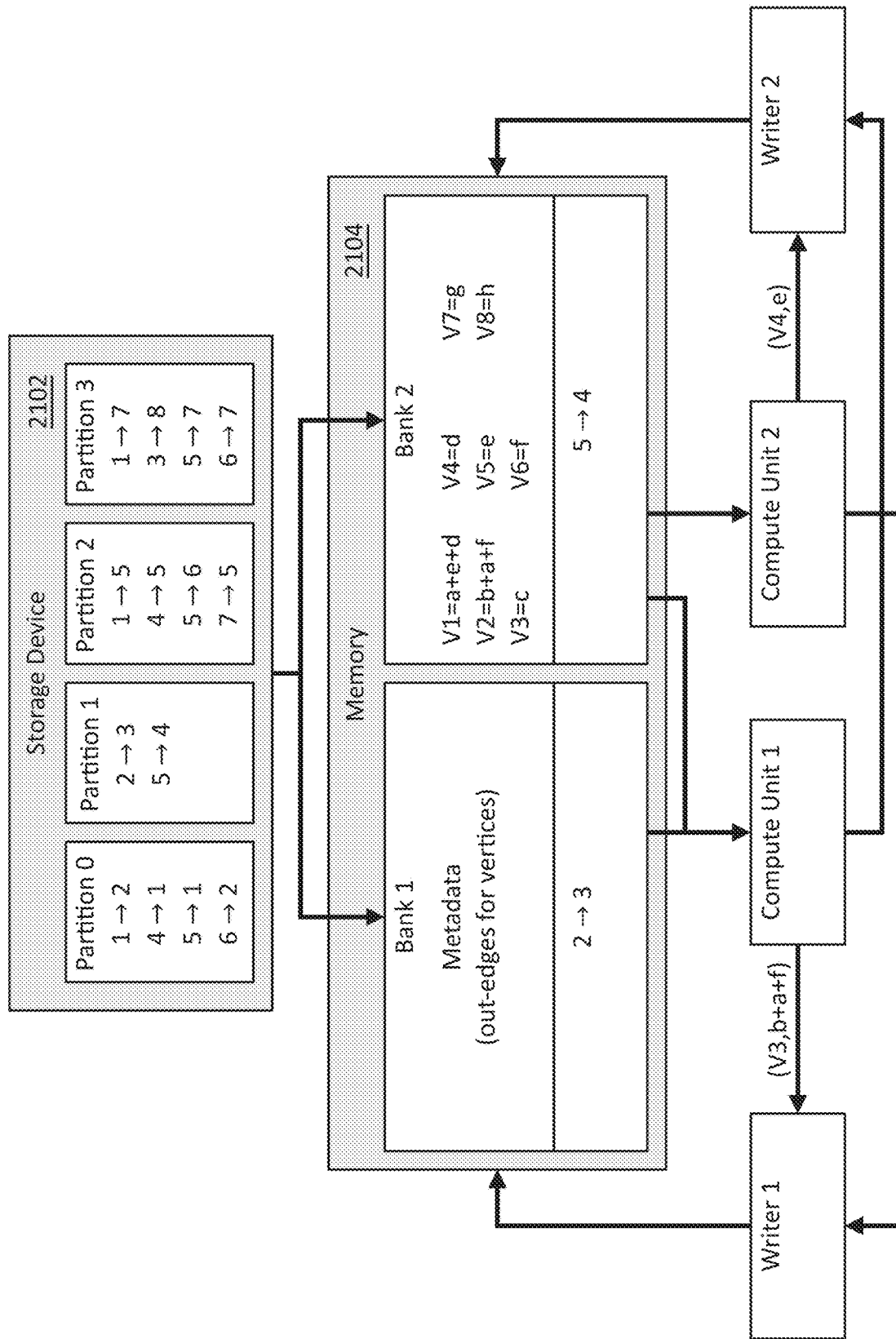
FIG. 21M illustrates an example embodiment of a graph processing pipeline and method in which one or more update packets for a second partition may be streamed from one or more compute units to one or more writers in accordance with example embodiments of the disclosure.
Figure 21N:
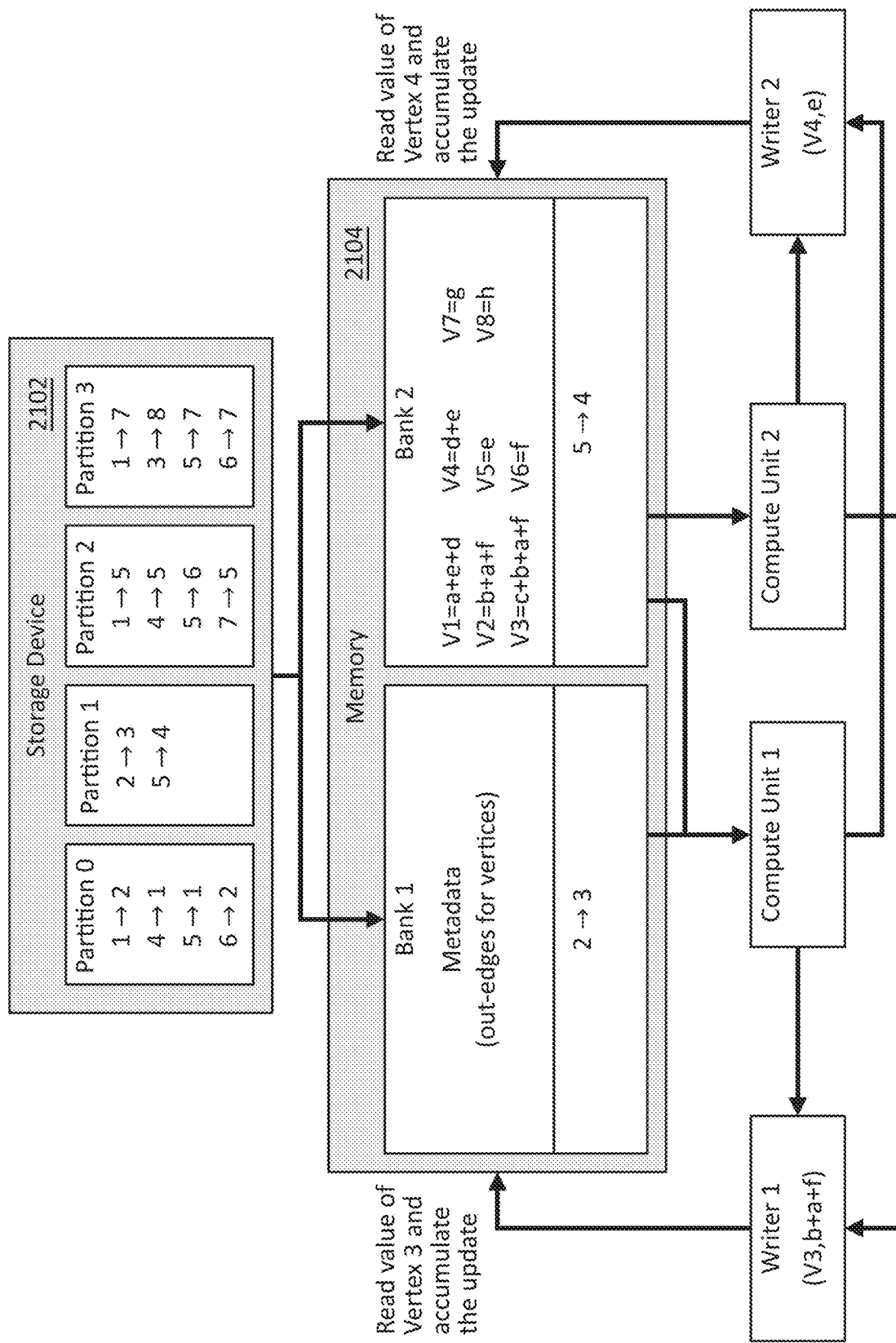
FIG. 21N illustrates an example embodiment of a graph processing pipeline and method in which one or more writers may use one or more update packets for a second partition to accumulate updates for one or more vertices in accordance with example embodiments of the disclosure.

FIG. 20 illustrates an example embodiment of a graph which may be processed, for example, with the embodiment of a graph processing pipeline illustrated in FIG. 19 and/or the embodiment of a graph processing pipeline and method illustrated in FIGS. 21A-21N in accordance with example embodiments of the disclosure. The embodiment illustrated in FIG. 20 may include eight vertices indicated as V1-V8 and with various incoming and outgoing edges. By way of example, an edge that is outgoing from vertex V2 and incoming to vertex V3 is shown as 2→3, but labels for other edges have been omitted to avoid obscuring the drawings. However, the other edges may similarly be indicated as x→y where the edge may be outgoing from vertex x and incoming to vertex y.

FIGS. 21A-21N illustrate an example embodiment of a graph processing pipeline and method in accordance with example embodiments of the disclosure. As explained in more detail below. FIG. 21A illustrates an example embodiment in an initial condition. FIG. 21B illustrates an example embodiment in which one or more edges from a first partition may be read into one or more banks in accordance with example embodiments of the disclosure. FIG. 21C illustrates an example embodiment in which one or more edges for a first partition may be streamed to one or more compute units. FIG. 21D illustrates an example embodiment in which one or more compute units may create one or more update packets for a first partition. FIG. 21E illustrates an example embodiment in which one or more update packets for a first partition may be streamed from one or more compute units to one or more writers FIG. 21F illustrates an example embodiment in which one or more update packets for a first partition may have arrived at one or more writers. FIG. 21G illustrates an example embodiment in which one or more writers may use one or more update packets for a first partition to accumulate updates for one or more vertices. FIG. 21H illustrates an example embodiment in which one or more update packets for a first partition may be streamed from one or more compute units to one or more writers. FIG. 21I illustrates an example embodiment in which one or more writers may use one or more update packets for a first partition to accumulate updates for one or more vertices. FIG. 21J illustrates an example embodiment in which one or more edges for a second partition may be read into one or more banks. FIG. 21K illustrates an example embodiment in which one or more edges for a second partition may be streamed to one or more compute units. FIG. 21L illustrates an example embodiment in which one or more compute units may create one or more update packets for a second partition. FIG. 21M illustrates an example embodiment in which one or more update packets for a second partition may be streamed from one or more compute units to one or more writers. FIG. 21N illustrates an example embodiment in which one or more writers may use one or more update packets for a second partition to accumulate updates for one or more vertices, For purposes of illustration, the embodiment illustrated in FIGS. 21A-21N may be described in the context of a graph processing algorithm that may implement a summing function for the graph illustrated in FIG. 20, but any other type of processing algorithm and/or graph may be used.

The embodiment illustrated in FIGS. 21A-21N may include a storage device 2102, a memory 2104, a first compute unit 2106, a second compute unit 2108, a first writer 2110, and a second writer 2112. In some of FIGS. 21A-21N, some of the reference numbers may be omitted to prevent them from obscuring dataflow illustrated therein.

The memory 2104 may include two banks indicated as Bank 1 and Bank 2. The first compute unit 2106 may be configured to communicate with Bank 1, and the second compute unit 2108 may be configured to communicate with Bank 2.

The first writer 2110 may be configured to write updates to vertices V1, V3, V5, and V7. The second writer 2112 may be configured to write updates to vertices V2, V4, V6, and V8. In some embodiments, both writers may use one or more ports of Bank 2 to update all vertex values, for example, to overcome what may be a limited number of ports for each memory bank.

FIG. 21A illustrates an initial configuration in which the vertices V1-V8 may have been partitioned into P=4 partitions using a topology-based partitioning technique in accordance with example embodiments of the disclosure, for example, as described above with respect to FIGS. 12-16. The initial values of vertices V1-V8, which may be a, b, c, d, e, f, and g, respectively, may be stored in Bank 2. Metadata such as out-edges for each vertex may be stored in Bank 1. Data for the edges of the graph illustrated in FIG. 19 may be stored in four partitions indicated as Partition 0 through Partition 3 in the storage device 2102.

As illustrated in FIG. 21B, processing may begin by reading the edges from Partition 0 in the storage device 2102 and storing them in Bank 1 and Bank 2 of memory 2104. Specifically, edges 1→2 and 4→1 may be stored in Bank 1, and edges 5→1 and 6→2 may be stored in Bank 2.

Referring to FIG. 21O, the edge 1→2 and value a of vertex V1 may be streamed to Compute Unit 1, and the edge 5→1 and value e of vertex V5 may be streamed to Compute Unit 2.

Referring to FIGS. 21D-21F, Compute Units 1 and 2 may create update packets (V2,a) and (V1,e), respectively, which may be streamed to Writers 2 and 1, respectively, based on the ranges of vertices they are assigned to. The compute units and writers may be configured as a pipeline so that the next edges and vertex values 4→1,d and 6→2,f may be streamed to Compute Units 1 and 2, respectively, concurrently with the update packets (V2,*a*) and (V1,*e*), being streamed to Writers 2 and 1, respectively, as shown in FIGS. 21E and F.

Referring to FIG. 21G, Writer 1 may use update packet (V1,*e*) to accumulate the update for vertex V1, and Writer 2 may use update packet (V2,*a*) to accumulate the update for vertex V2.

Referring to FIG. 21H, the next update packets (V1,*d*) and (V2,*f*) may be streamed from the compute units to the writers, then accumulated for vertices V1 and V2, respectively, as shown in FIG. 21I. This may conclude the processing for the edges from Partition 0.

Referring to FIG. 21J, processing for the edges from Partition 1 may begin by reading the edges in Partition 1 of the storage device 2102 and storing them in Bank 1 and Bank 2 of memory 2104. Specifically, edge 2→3 may be stored in Bank 1, and edge 5→4 may be stored in Bank 2.

Referring to FIG. 21K, the edge 2→3 and value b+a+f of vertex V2 may be streamed to Compute Unit 1, and the edge 5→4 and value a of vertex V5 may be streamed to Compute Unit 2. Because b+a+f may be the final value of vertex V2 from Partition 0, the newly updated value for vertex V2 may be propagated, e.g., used to calculate the value for vertex V3 for the next iteration of the graph processing algorithm. Thus, the edge 2→3 may not be read during the next iteration.

Referring to FIGS. 21L-21M, Compute Units 1 and 2 may create update packets (V3,*b+a+f*) and (V4,*e*), respectively, which may be streamed to Writers 2 and 2, respectively, based on the ranges of vertices they are assigned to.

Referring to FIG. 21N, Writer 1 may use update packet (V3,*b+a+f*) to accumulate the update for vertex V3, and Writer 2 may use update packet (V4,*e*) to accumulate the update for vertex V4.

As described above, the embodiment illustrated in FIGS. 21A-21N may be arranged in a pipeline configuration in which streams of data from the storage device 2102, and through memory 2104, Compute Units 1 and 2, and Writers 1 and 2 may flow in parallel, and the processing operations of the Compute Units 1 and 2, and Writers 1 and 2 may also be performed in parallel.

The operations and/or components described with respect to the embodiment illustrated in FIGS. 21A-21N, as well as all of the other embodiments described herein, are example operations and/or components. In some embodiments, some operations and/or components may be omitted and/or other operations and/or components may be included. Moreover, in some embodiments, the temporal and/or spatial order of the operations and/or components may be varied.

Near Storage Implementation

Figure 22:
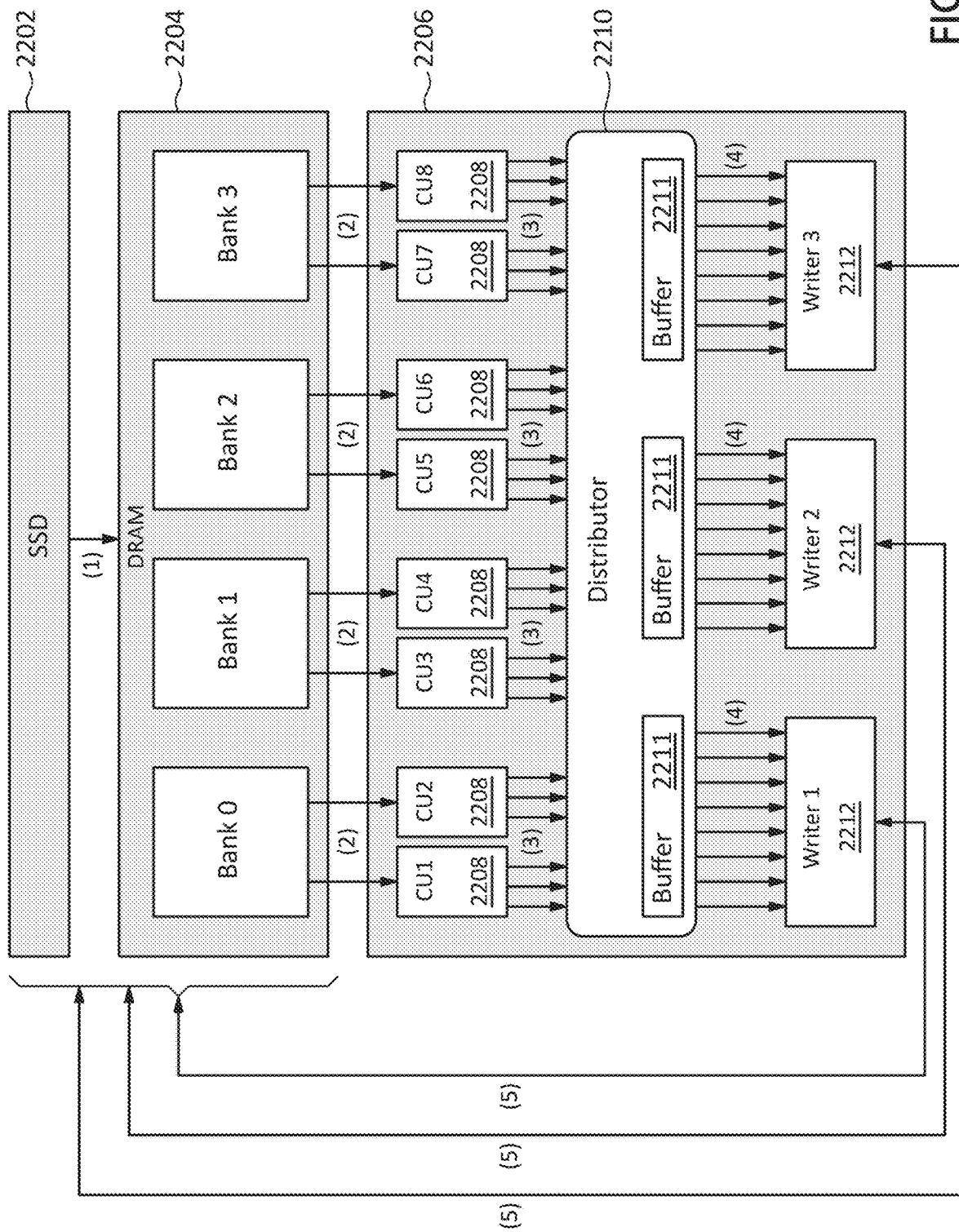
FIG. 22 illustrates an example embodiment of a near-storage graph processing system in accordance with example embodiments of the disclosure.

FIG. 22 illustrates an example embodiment of a near-storage graph processing system in accordance with example embodiments of the disclosure. For purposes of illustration, the embodiment illustrated in FIG. 2 may be implemented as a computational storage device having an SSD 2202, a memory such as DRAM 2204, and an accelerator device 2206. The principles of this disclosure, however, are not limited to these implementation details.

In some embodiments, the accelerator device 2206 may be implemented with a combinational and/or sequential logic, one or more CPLDs, FPGAs, ASICs, and/or the like as described above. In some embodiments, the memory 2204 may be integral with the accelerator device 2206, for example, fabricated on the same integrated circuit (IC).

The accelerator device 2206 may include multiple compute units 2208, a distributor 2210, and multiple writers 2212. The compute units may be identified as CU1, CU2, . . . , CU8, although any number of compute units may be used. Similarly, the writers may be identified as Writer 1, Writer 2, and Writer 3, although any number of writers may be used.

One or more first streams of data (1) may include edge and/or vertex information read from the SSD 2202 and loaded into memory 2204. This data may be in the form of partial, full, and/or multiple blocks and/or partitions depending, for example, on the capacity of the memory 2204 and/or banks therein. For example, edge lists for CU1 and CU2 may be loaded into Bank 0, edge lists for CU3 and CU4 may be loaded into Bank 1, edge lists for CU5 and CU6 may be loaded into Bank 2, and edge lists for CU7 and CU8 may be loaded into Bank 3. Multiple banks may be used, for example, to take advantage of ports for each memory bank.

One or more second streams of data (2) may include vertex and/or edge data processed by the compute units 2208 to generate one or more third streams of updates (3). The number of third streams (3) may be based, for example, on the number of writers 2212. In this example, each compute unit 2208 may generate three streams of updates (3) for the three writers 2212. For example, for a case with 30 vertices (which may also be referred to as nodes) and 3 writers 2212, Writer 0 may update vertices between 0 and 9, Writer 1 may update vertices between 10 and 19, and Writer 3 may update vertices between 20 and 29. Thus, each compute unit 2208 may generate one stream (3) for each writer 2212 based on the destination vertex of each update.

The distributor 2210 may assign one or more fourth streams (4) to the writers 2212 based on the destination vertex of each update. In some embodiments, the distributor 2210 may implement a buffer 2211 and/or a data structure for each of the writers 2212 and assign the streams for each writer 2212 to the corresponding buffer 2211 and/or data structure.

The writers 2212 may generate one or more fifth streams of data (5) written to the memory 2204 and/or SSD 2202. For example, if the updates for all vertices do not fit in a bank of the memory 2204, one or more of the updates may be written to the SSD 2202, otherwise the writer 2212 may only write the updates to memory 2204. In some embodiments, as mentioned above, the writers 2212 may only update a portion (e.g., a range of the vertices) to avoid atomic updates which may reduce synchronization overhead. For example, in some embodiments, each writer may implement one thread. In some embodiments, a daemon module may run in the background to write the updates to the memory 2204 and/or SSD 2202.

In some embodiments, the distributor 2210 and or writers 2212 may arrange the updates in a manner similar to a map-reduce paradigm. Updates may be pushed to different buffers, and corresponding writers may pull updates from the buffers and apply them to the memory 2204 and/or the SSD 2202. Depending on the implementation details, this may increase the number of sequential memory accesses which may improve the speed and/or efficiency of the memory accesses.

In some embodiments, the number of partitions may be determined, for example, so that edges fit in about half of the memory, which may leave the remaining half of the memory for vertex data, future values, metadata, and/or the like. In one example implementation having 4 GB of DRAM, and using 64-bit edge data, dedicating about half of the DRAM space (2 GB) for edges (e.g., at most about 270 million edges), and with a graph having 1 billion edges, the data may be divided into at least 4 partitions. In some embodiments having a large number of edges in one partition, one partition may not be able to fit in memory. In such a situation, the partition may be divided into equal chunks processed in multiple operations. Depending on the implementation details, this may balance the number of computations per compute unit.

In some embodiments, the performance of an accelerator may be improved or optimized through resource allocation by assigning compute units to different banks and balancing the partitions. For example, in some embodiments, the number of compute units and writers, with a certain number of ports per bank, may be determined as follows:

$$\left\lceil \frac{K}{4} \right\rceil + \max(K, W) < \frac{\text{ports}}{\text{bank}} \quad (2)$$

where K may be the number of compute units and W may be the number of writers. In some embodiments, the length of streams may be assigned, for example, to prevent data flow from stalling. In some embodiments, assigning different compute units to different banks may improve the port and/or resource utilization of the system.

In some embodiments, and depending on the implementation details, running a graph processing algorithm on a computational storage device may provide one or more benefits. For example, the energy efficiency of an accelerator device may be higher than a central processing unit (CPU). Moreover, in some embodiments, a CPU may be underutilized in a graph processing application, and therefore, an embodiment implemented with an accelerator device may achieve higher utilization which may improve performance, reduce energy consumption, reduce costs, and/or the like. Thus, a computational storage device such as that illustrated in FIG. 22 may provide a high level of parallelism and/or efficiency which may improve the performance of a graph processing algorithm. Additionally, some embodiments may implement overlapping computation and I/O accesses, for example, by requesting the next partition while the current partition is still being processed which may reduce or minimize execution time.

Additionally, the principles of this disclosure may enable a high level of flexibility for implementing graph processing algorithms. For example, in some embodiments, multiple accelerator devices may be used to run multiple graph processing applications on a graph dataset simultaneously. In some embodiments this may be implemented, for example, by including a second accelerator device 2206 and/or memory 2204 in the system of FIG. 22.

Although the principles disclosed herein are not limited to any particular applications, in some embodiments, the techniques may be especially beneficial when applied to near-storage graph processing. For example, a computational storage device such as a solid state drive (SSD) having an accelerator device such as a field programmable gate array (FPGA) may provide a high level of parallelism and/or efficiency which may improve the performance of a graph processing algorithm. However, in some embodiments, a computational storage device may have a limited amount of memory. Thus, the graph vertices and/or edges may be partitioned into a larger number of smaller partitions to fit into the available memory. The partitioning and/or resource allocation techniques disclosed herein may enable a graph processing algorithm to scale with an increasing number of partitions, thereby enabling some embodiments to improve parallelism, increase I/O sequentiality, reduce I/O accesses, reduce synchronization overhead, and/or the like, while running on a computational storage device with limited memory.

The computational storage device illustrated in FIG. 22 may be implemented with, and/or used in connection with, one or more servers, server chassis, server racks, datarooms, datacenters, edge data centers, mobile edge datacenters, and/or any combination thereof.

Figure 23:
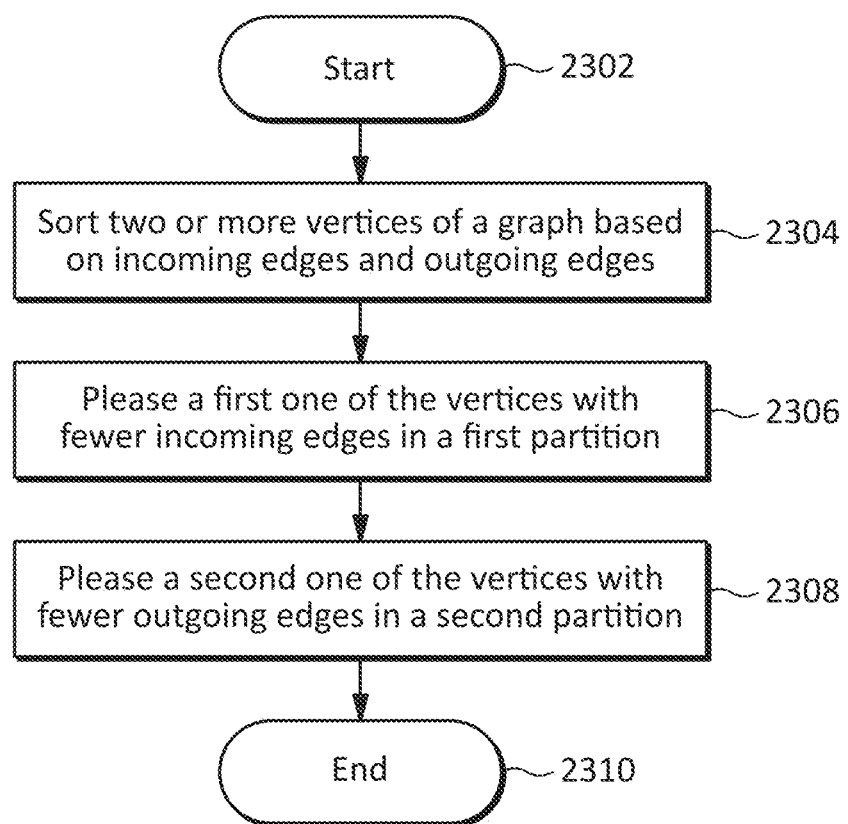
FIG. 23 illustrates an embodiment of a method of partitioning a graph for processing in accordance with example embodiments of the disclosure.

FIG. 23 illustrates an embodiment of a method of partitioning a graph for processing in accordance with example embodiments of the disclosure. The method may begin at operation 2302. At operation 2304, the method may sort two or more vertices of the graph based on incoming edges and outgoing edges. At operation 2306, the method may place a first one of the vertices with fewer incoming edges in a first partition. At operation 2308, the method may place a second one of the vertices with fewer outgoing edges in a second partition. The method may end at operation 2310.

The operations and/or components described with respect to the embodiment illustrated in FIG. 23, as well as all of the other embodiments described herein, are example operations and/or components. In some embodiments, some operations and/or components may be omitted and/or other operations and/or components may be included. Moreover, in some embodiments, the temporal and/or spatial order of the operations and/or components may be varied.

The embodiments disclosed above have been described in the context of various implementation details, but the principles of this disclosure are not limited to these or any other specific details. For example, some functionality has been described as being implemented by certain components, but in other embodiments, the functionality may be distributed between different systems and components in different locations and having various user interfaces. Certain embodiments have been described as having specific processes, operations, etc., but these terms also encompass embodiments in which a specific process, step, etc. may be implemented with multiple processes, operations, etc., or in which multiple processes, operations, etc. may be integrated into a single process, step, etc. A reference to a component or element may refer to only a portion of the component or element. For example, a reference to an integrated circuit may refer to all or only a portion of the integrated circuit, and a reference to a block may refer to the entire block or one or more subblocks. The use of terms such as "first" and "second" in this disclosure and the claims may only be for purposes of distinguishing the things they modify and may not indicate any spatial or temporal order unless apparent otherwise from context. In some embodiments, based on" may refer to "based at least in part on." In some embodiments, "disabled" may refer to "disabled at least in part." A reference to a first element may not imply the existence of a second element. Various organizational aids such as section headings and the like may be provided as a convenience, but the subject matter arranged according to these aids and the principles of this disclosure are not limited by these organizational aids.

The various details and embodiments described above may be combined to produce additional embodiments according to the inventive principles of this patent disclosure. Since the inventive principles of this patent disclosure may be modified in arrangement and detail without departing from the inventive concepts, such changes and modifications are considered to fail within the scope of the following claims.

The invention claimed is:

1. A method of partitioning a graph for processing, the method comprising:
sorting two or more vertices of the graph based on incoming edges and outgoing edges;
placing a first one of the vertices with fewer incoming edges in a first partition; and
placing a second one of the vertices with fewer outgoing edges in a second partition.

2. The method of claim 1, wherein:
the first one of the vertices has a lowest number of incoming edges; and
the first one of the vertices is placed in a first available partition.

3. The method of claim 2, wherein:
the second one of the vertices has a lowest number of outgoing edges; and
the second one of the vertices is placed in a second available partition.

4. The method of claim 3, further comprising:
deleting one or more edges associated with the first and second ones of the vertices from the graph;
placing one of the vertices with fewer remaining incoming edges in the first partition; and
placing one of the vertices with fewer remaining outgoing edges in the second partition.

5. The method of claim 2, wherein the first one of the vertices has more outgoing edges than incoming edges.

6. The method of claim 3, wherein the second one of the vertices has more incoming edges than outgoing edges.

7. The method of claim 1, further comprising determining a number of the partitions based on a size of a memory for processing the partitions and a number of edges in the graph.

8. An apparatus comprising:
a first processor configured to receive, from a memory, first vertex data and first edge data associated with the first vertex data and generate a first update based on the first vertex data and first edge data;
a second processor configured to receive, from the memory, second vertex data and second edge data associated with the second vertex data and generate a second update based on the second vertex data and second edge data; and
a memory circuit configured to write the first update to the memory.

9. The apparatus of claim 8, wherein the memory circuit writer comprises a first memory circuit, and the apparatus further comprises a second memory circuit configured to write one of the first or second updates to the memory.

10. The apparatus of claim 9, further comprising a distributor configured to buffer the first and second updates and distribute the first and second updates to the first memory circuit and the second memory circuit, respectively.

11. The apparatus of claim 9, wherein the first processor is configured to send the first update to the first memory circuit or the second memory circuit based on a memory location for the first update.

12. The apparatus of claim 8, wherein the memory comprises:
a first bank configured to store the first edge data; and
a second bank configured to store the second edge data.

13. The apparatus of claim 12, further comprising:
a storage medium; and
the memory, wherein the memory is configured to receive the first and second vertex data and the first and second edge data from the storage medium.

14. The apparatus of claim 13, wherein the memory circuit is configured to write at least a portion of the first update to the storage medium based on a utilization of the memory.

15. The apparatus of claim 8, wherein:
the first update is generated by a first operation of the first processor; and
the first update is used by a second operation of the first processor.

16. The apparatus of claim 8, wherein the first processor and the memory circuit are configured as a pipeline for the first edge data and the first update.

17. The apparatus of claim 8, wherein the memory circuit comprises a first memory circuit, the apparatus further comprising:
a third processor configured to receive, from the memory, the first vertex data and the first edge data and generate a third update based on the first vertex data and first edge data;
a fourth processor configured to receive, from the memory, the second vertex data and the second edge data and generate a fourth update based on the second vertex data and second edge data; and
a second memory circuit configured to write the third update to the memory, wherein:
the first processor, the second processor, and the first memory circuit are configured to run a first application on the first vertex data, first edge data, second vertex data, and second edge data; and
the third processor, the fourth processor, and the second memory circuit are configured to run a second application on the first vertex data, first edge data, second vertex data, and second edge data concurrently with the first application.

18. A method for updating vertices of a graph, the method comprising:
storing a first update for a first vertex in a first buffer;
storing a second update for a second vertex in a second buffer;
transferring the first update from the first buffer to a memory using a first thread; and
transferring the second update from the second buffer to the memory using a second thread.

19. The method of claim 18, wherein the first buffer is processed by a single thread.

20. The method of claim 18, wherein the first and second buffers are configured to store the first and second vertices based on ranges of the vertices.

* * * * *